US011856170B2

(12) United States Patent
Sakai

(10) Patent No.: US 11,856,170 B2
(45) Date of Patent: Dec. 26, 2023

(54) MEDIUM CARRYING DEVICE, CONTROL METHOD, AND CONTROL PROGRAM

(71) Applicant: PFU LIMITED, Kahoku (JP)

(72) Inventor: Masaaki Sakai, Kahoku (JP)

(73) Assignee: PFU LIMITED, Kahoku (JP)

(*) Notice: Subject to any disclaimer, the term of this patent is extended or adjusted under 35 U.S.C. 154(b) by 0 days.

(21) Appl. No.: 18/040,139

(22) PCT Filed: Oct. 12, 2020

(86) PCT No.: PCT/JP2020/038523
§ 371 (c)(1),
(2) Date: Jan. 31, 2023

(87) PCT Pub. No.: WO2022/079770
PCT Pub. Date: Apr. 21, 2022

(65) Prior Publication Data
US 2023/0276011 A1    Aug. 31, 2023

(51) Int. Cl.
*H04N 1/04*       (2006.01)
*G06T 7/13*       (2017.01)

(52) U.S. Cl.
CPC ............ *H04N 1/04* (2013.01); *G06T 7/13* (2017.01)

(58) Field of Classification Search
None
See application file for complete search history.

(56) References Cited

U.S. PATENT DOCUMENTS

| 10,757,281 B1 * | 8/2020 | Wada ................ H04N 1/3878 |
| 2002/0054377 A1 | 5/2002 | Ouchi et al. |

(Continued)

FOREIGN PATENT DOCUMENTS

| JP | 2002-142054 A | 5/2002 |
| JP | 2002-142084 A | 5/2002 |

(Continued)

OTHER PUBLICATIONS

Japanese Office Action dated Sep. 12, 2023 regarding Japanese Patent Application No. 2022-557241 corresponding to U.S. Appl. No. 18/040,139 (4 pages) with English Translation (7 pages).
International Search Report dated Dec. 28, 2020 for corresponding PCT Application No. PCT/JP2020/038523 (3 pages) with English Translation (3 pages).

(Continued)

*Primary Examiner* — Dung D Tran
(74) *Attorney, Agent, or Firm* — LEWIS ROCA ROTHGERBER CHRISTIE LLP

(57) ABSTRACT

Provided are a medium conveyance apparatus, control method, and control program is to enable more precisely detecting an end part in a main scan direction of a medium from an image. A medium conveyance apparatus includes a conveying module to convey a medium, an imaging device to capture an image of the conveyed medium, a storage device to store a low reliability region inside an input image of a medium captured by the imaging device based on a positional relationship between an imaging position of the imaging device and arrangement position of the conveying module, an edge pixel detection module to detect edge pixels from the input image, an end part detection module to detect an end part in a main scan direction of the medium based on edge pixels detected from a region not including the low reliability region inside the input image, and an output control module to output information relating to the detected end part.

16 Claims, 18 Drawing Sheets

(56) References Cited

U.S. PATENT DOCUMENTS

| | | | |
|---|---|---|---|
| 2019/0098174 A1* | 3/2019 | Kanaya | H04N 1/19 |
| 2019/0281170 A1* | 9/2019 | Yokogawa | G06V 10/44 |
| 2020/0120236 A1 | 4/2020 | Miyashita et al. | |
| 2020/0336615 A1* | 10/2020 | Ono | G06V 10/243 |
| 2022/0274794 A1* | 9/2022 | Sakai | B65H 5/062 |
| 2022/0274795 A1* | 9/2022 | Sakai | B65H 5/062 |

FOREIGN PATENT DOCUMENTS

| | | |
|---|---|---|
| JP | 2019-193159 A | 10/2019 |
| JP | 2020-61720 A | 4/2020 |

OTHER PUBLICATIONS

Written Opinion dated Dec. 28, 2020 for corresponding PCT Application No. PCT/JP2020/038523 (5 pages) with English Translation (5 pages).

International Preliminary Report on Patentability dated Apr. 13, 2023 for corresponding PCT Application No. PCT/JP2020/038523 (6 pages) with English Translation (6 pages).

\* cited by examiner

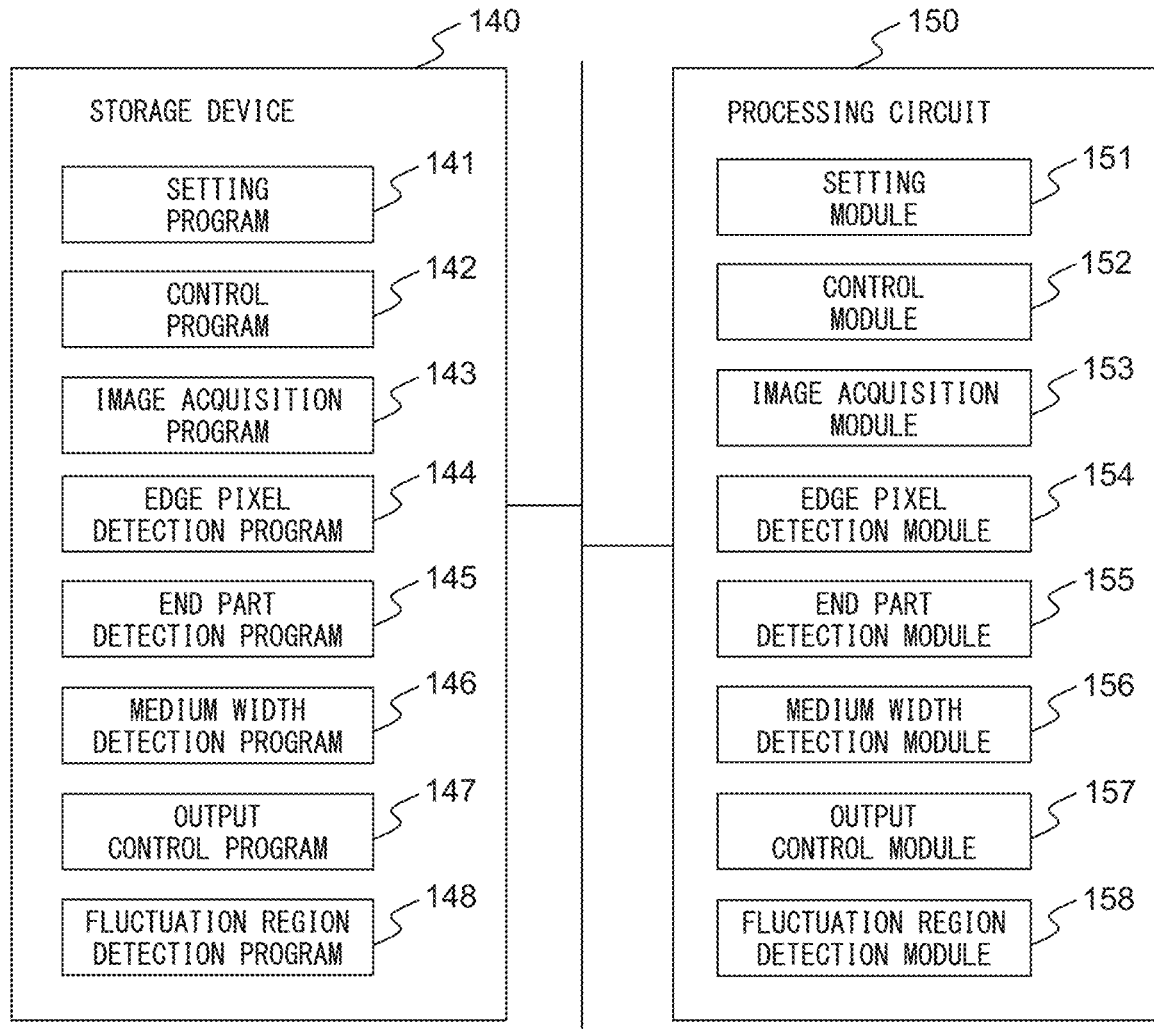

MEDIUM CARRYING DEVICE, CONTROL METHOD, AND CONTROL PROGRAM

CROSS-REFERENCE TO RELATED APPLICATION(S)

This application is a U.S. National Phase Patent Application and claims priority to and the benefit of International Application Number PCT/JP2020/038523, filed on Oct. 12, 2020, the entire content of which is incorporated herein by reference.

FIELD

The present disclosure relates to a medium conveyance apparatus, more particularly relates to a medium conveyance apparatus to detect an end part of the medium from an image of a medium being conveyed.

BACKGROUND

In general, a scanner or other medium conveyance apparatus for reading a document or other medium has the function of identifying a region including a medium in a read image so as to cut out the region including the medium from the read image. For this reason, a medium conveyance apparatus is asked to precisely detect end parts of the medium.

An image processing device which determines whether a thickness of a document is not constant based on a difference of brightness of a background region of an input image and, if the thickness is not constant, digitalizing the image by a threshold value in accordance with the brightness of the background region to identify the background region and document region has been disclosed (see PTL 1).

CITATIONS LIST

Patent Literature

Patent Literature 1: Japanese Unexamined Patent Publication No. 2019-193159

SUMMARY

In a medium conveyance apparatus, it is desirable to more precisely detect an end part of a medium from an image.

An object of the medium conveyance apparatus, control method, and control program is to enable more precisely detecting an end part in a main scan direction of a medium from an image.

According to some embodiments, a medium conveyance apparatus includes a conveying module to convey a medium, an imaging device to capture an image of the conveyed medium, a storage device to store a low reliability region inside an input image of a medium captured by the imaging device based on a positional relationship between an imaging position of the imaging device and arrangement position of the conveying module, an edge pixel detection module to detect edge pixels from the input image; an end part detection module to detect an end part in a main scan direction of the medium based on edge pixels detected from a region not including the low reliability region inside the input image; and an output control module to output information relating to the detected end part.

According to some embodiments, a medium conveyance apparatus includes a conveying module to convey a medium, a reference member having a single color, an imaging device located facing the reference member, to capture an image of the conveyed medium and a vicinity of the conveyed medium, an edge pixel detection module to detect a plurality of edge pixels from an input image of the medium and vicinity of the medium captured by the imaging device, a fluctuation region detection module to detect a fluctuation region with tonal values fluctuating with respect to peripheral pixels inside a region in which the reference member is included in the input image based on a positional relationship of the plurality of edge pixels detected by the edge pixel detection module, an end part detection module to detect an end part in a main scan direction of the medium based on edge pixels detected from a region not including the fluctuation region detected by the fluctuation region detection module inside the input image, and an output control module to output information relating to the detected end part.

According to some embodiments, a control method of a medium conveyance apparatus having a conveying module to convey a medium, an imaging device to capture an image of the conveyed medium, and a storage device, includes storing in the storage device a low reliability region inside an input image of a medium captured by the imaging device based on a positional relationship between an imaging position of the imaging device and arrangement position of the conveying module, detecting edge pixels from the input image, detecting an end part in a main scan direction of the medium based on edge pixels detected from a region not including the low reliability region inside the input image, and outputting information relating to the detected end part.

According to some embodiments, a control method of a medium conveyance apparatus having a conveying module to convey a medium, a reference member having a single color, and an imaging device located facing the reference member, to capture an image of the conveyed medium and a vicinity of the conveyed medium, includes detecting a plurality of edge pixels from an input image of the medium and vicinity of the medium captured by the imaging device, detecting a fluctuation region with tonal values fluctuating with respect to peripheral pixels inside a region in which the reference member is included in the input image based on a positional relationship of the plurality of edge pixels detected, detecting an end part in a main scan direction of the medium based on edge pixels detected from a region not including the fluctuation region inside the input image, and outputting information relating to the detected end part.

According to some embodiments, a control program of a medium conveyance apparatus having a conveying module to convey a medium, an imaging device to capture an image of the conveyed medium, and a storage device, causes the medium conveyance apparatus to execute storing in the storage device a low reliability region inside an input image of a medium captured by the imaging device based on a positional relationship between an imaging position of the imaging device and arrangement position of the conveying module, detecting edge pixels from the input image, detecting an end part in a main scan direction of the medium based on edge pixels detected from a region not including the low reliability region inside the input image, and outputting information relating to the detected end part.

According to some embodiments, a control program of a medium conveyance apparatus having a conveying module to convey a medium, a reference member having a single color, and an imaging device located facing the reference member, to capture an image of the conveyed medium and a vicinity of the conveyed medium, causes the medium conveying apparatus to execute detecting a plurality of edge pixels from an input image of the medium and vicinity of the medium captured by the imaging device, detecting a fluctuation region with tonal values fluctuating with respect to peripheral pixels inside a region in which the reference member is included in the input image based on a positional relationship of the plurality of edge pixels detected, detecting an end part in a main scan direction of the medium based on edge pixels detected from a region not including the fluctuation region inside the input image, and outputting information relating to the detected end part.

According to the embodiments, the medium conveyance apparatus, control method, and control program can more precisely detect an end part in a main scan direction of a medium from an image.

The object and advantages of the invention will be realized and attained by means of the elements and combinations, in particular, described in the claims. It is to be understood that both the foregoing general description and the following detailed description are exemplary and explanatory, and are not restrictive of the invention, as claimed.

BRIEF DESCRIPTION OF DRAWINGS

FIG. 4 is a view showing the schematic constitution of a storage device 140 and processing circuit 150.

FIG. 5 is a view showing one example of a data structure of a region table.

DESCRIPTION OF EMBODIMENTS

Hereinafter, a medium conveyance apparatus, a control method and a control program according to an embodiment will be described with reference to the drawings. However, it should be noted that the technical scope of the invention is not limited to these embodiments, and extends to the inventions described in the claims and their equivalents.

Figure 1:
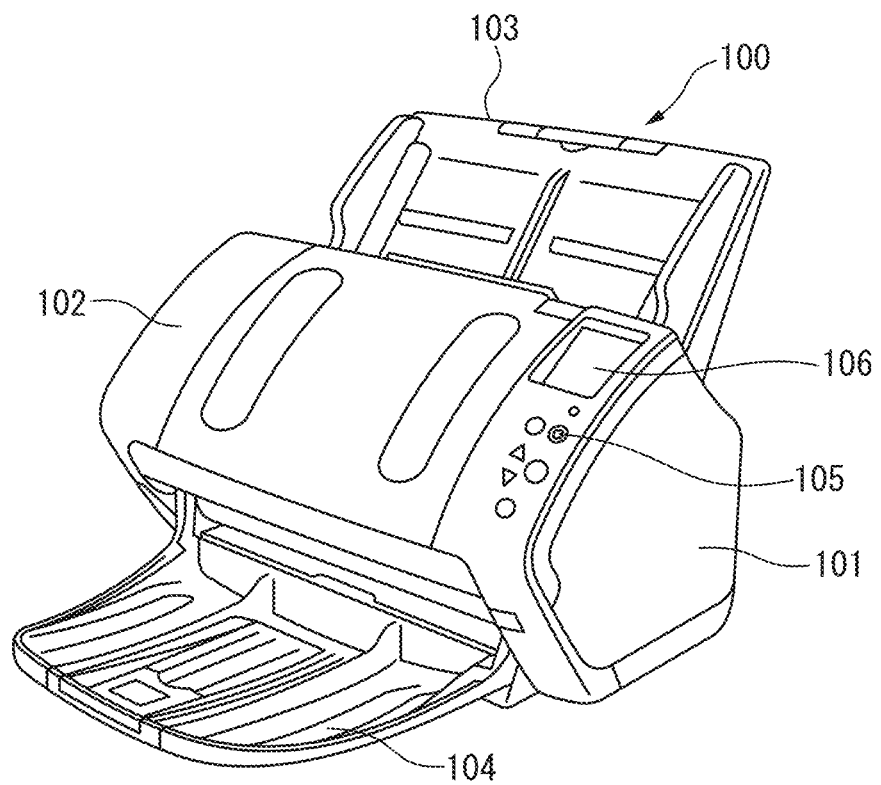
FIG. 1 is a perspective view showing a medium conveyance apparatus 100 according to an embodiment.

FIG. 1 is a perspective view showing a medium conveyance apparatus 100 constituted as an image scanner. The medium conveyance apparatus 100 conveys a document medium and captures an image of it. The medium is printing paper, thick paper, a card, passport, etc. The card is for example a plastic resin card. In particular, the card is an ID (identification) card prescribed by the ISO (International Organization for Standardization)/IEC (International Electrotechnical Commission) 7810. Note that the card may also be another type of card. The medium conveyance apparatus 100 may also be a facsimile, copier, multifunction peripheral (MFP), etc.

The medium conveyance apparatus 100 is provided with a lower housing 101, upper housing 102, stacking tray 103, ejection tray 104, operating device 105, display device 106, etc.

The upper housing 102 is located at a position covering the upper surface of the medium conveyance apparatus 100 and engages with the lower housing 101. The stacking tray 103 engages with the lower housing 101 to be able to stack the conveyed medium. The ejection tray 104 engages with the lower housing 101 to be able to hold the conveyed medium.

The operating device 105 has buttons or other input devices and an interface circuit for acquiring signals from the input devices, receives input operations of a user, and outputs operating signals corresponding to the input operations of a user. The display device 106 has a display including liquid crystals, organic Els (Electro-Luminescence), etc., and an interface circuit for outputting image data to the display and displays the image data on the display.

Figure 2:
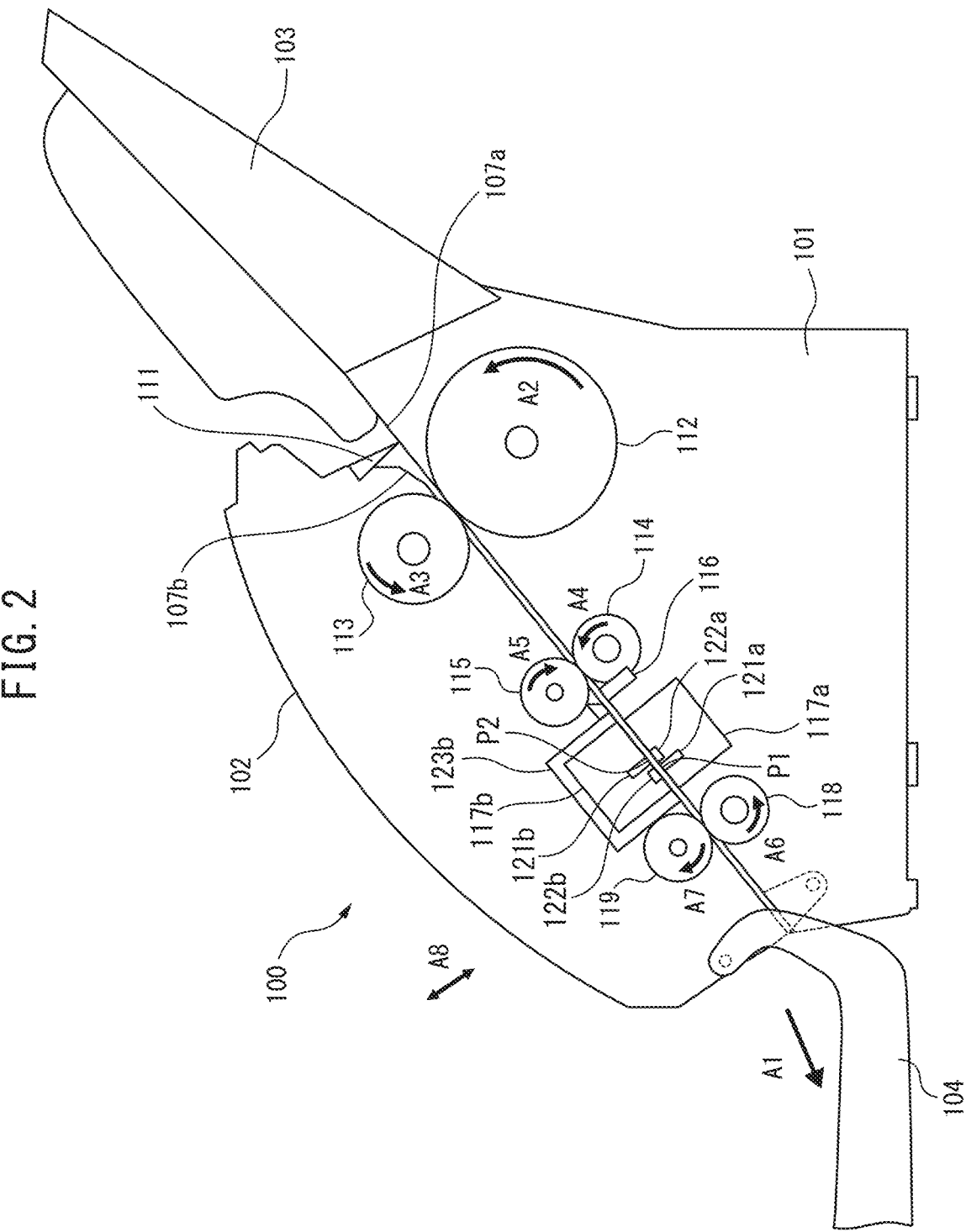
FIG. 2 is a view for explaining a conveyance route inside of a medium conveyance apparatus 100.

FIG. 2 is a view for explaining a conveyance route inside of the medium conveyance apparatus 100.

The conveyance route inside of the medium conveyance apparatus 100 has a first medium sensor 111, feed roller 112, brake roller 113, first conveyance roller 114, second conveyance roller 115, second medium sensor 116, first imaging device 117a, second imaging device 117b, third conveyance roller 118, fourth conveyance roller 119, etc. Note that the numbers of the rollers are not limited to single ones. The numbers of the rollers may respectively be multiple ones as well. Below, the first imaging device 117a and the second imaging device 117b will sometimes be referred to all together as the "imaging devices 117".

The upper surface of the lower housing 101 forms a lower guide 107a of the conveyance path of the medium, while the lower surface of the upper housing 102 forms an upper guide 107b of the conveyance path of the medium. In FIG. 2, the arrow A1 shows the conveyance direction. Below, "upstream" will mean upstream of the medium in the conveyance direction A1 of the medium, while "downstream" means downstream of the medium in the conveyance direction A1.

The first medium sensor 111 is located at an upstream side of the feed roller 112 and brake roller 113. The first medium sensor 111 has a contact detection sensor and detects if the stacking tray 103 has the medium stacked on it. The first medium sensor 111 generates and outputs a first medium signal with a signal value changing between a state where the stacking tray 103 has the medium stacked on it and a state where it does not have the medium stacked on it.

The feed roller 112 and brake roller 113 are provided at the upstream side of the first conveyance roller 114 and the second conveyance roller 115. The feed roller 112 is provided at the lower housing 101 and feeds a medium stacked on the stacking tray 103 in order from the bottom side. The brake roller 113 is provided at the upper housing 102 and is located facing the feed roller 112.

The first conveyance roller 114 and the second conveyance roller 115 are provided at the downstream side of the feed roller 112 and brake roller 113. The first conveyance roller 114 is provided at the lower housing 101. The second conveyance roller 115 is provided at the upper housing 102 and is located facing the first conveyance roller 114.

The second medium sensor 116 is located at the downstream side of the first conveyance roller 114 and the second conveyance roller 115 and at the upstream side of the imaging devices 117. The second medium sensor 116 detects whether a medium is present at that position. The second medium sensor 116 includes a light emitter and a light receiver provided at one side of the medium conveyance path and a mirror or other reflection members provided at positions facing the light emitter and the light receiver across the conveyance path. The light emitter emits light toward the conveyance path. On the other hand, the light receiver receives light emitted by the light emitter and reflected by the reflection member, and generates and outputs a second medium signal of an electrical signal corresponding to the intensity of the light received. If a medium is present at the position of the second medium sensor 116, the light emitted by the light emitter is blocked by the medium, so the signal value of the second medium signal changes between the state where a medium is present at the position of the second medium sensor 116 and the state where a medium is not present. Note that the light emitter and the light receiver may also be provided at positions facing each other across the conveyance path and the reflection member may also be omitted.

The first imaging device 117a and the second imaging device 117b are examples of the imaging device. The first imaging device 117a has a first imaging sensor 121a and first reference member 122a. The second imaging device 117b has a second imaging sensor 121b, second reference member 122b, and conveyance guide 123b.

The first imaging sensor 121a is a contact optical system type CIS (contact image sensor) line sensor having imaging elements comprised of CMOS's (complementary metal oxide semiconductors) located in a line in the main scan direction. The first imaging sensor 121a is located facing the second reference member 122b functioning as a backing. Further, the first imaging device 117a has a lens for forming an image on an imaging element and an A/D converter for amplifying the electrical signal output from the imaging element and converting it from an analog to digital (A/D) format. The first imaging device 117a captures an image of the front surface of the conveyed medium and the vicinity of the medium every certain interval at the imaging position P1 to consecutively generate and output line images. In other words, there are single pixels in the vertical direction (sub scan direction) of the line image, while there are multiple pixels in the horizontal direction (main scan direction). Using the later explained processing circuit, a predetermined number of line images are combined and an input image is generated. In other words, the input image is an image of a medium captured by the imaging devices 117.

The first imaging sensor 121a captures an image of the second reference member 122b when the medium is not being conveyed. The surface of the second reference member 122b facing the first imaging sensor 121a has a single color (for example, white color). The medium conveyance apparatus 100 shades or otherwise corrects the image based on the image signal of the second reference member 122b captured.

The second imaging sensor 121b is a contact optical system type CIS line sensor having imaging elements comprised of CMOS's located in a line in the main scan direction. The second imaging sensor 121b is located facing the first reference member 122a functioning as a backing. Further, the second imaging device 117b has a lens for forming an image on an imaging element and an A/D converter for amplifying the electrical signal output from the imaging element and converting it from an analog to digital (A/D) format. The second imaging device 117b captures an image of the back surface of the conveyed medium and the vicinity of the medium every certain interval at the imaging position P2 to consecutively generate and output line images. Using the later explained processing circuit, a predetermined number of line images are combined and an input image is generated. In other words, the input image is an image of a medium captured by the imaging devices 117.

The second imaging sensor 121b captures an image of the first reference member 122a when the medium is not being conveyed. The surface of the first reference member 122a facing the second imaging sensor 121b has a single color (for example, white color). The medium conveyance apparatus 100 shades or otherwise corrects the image based on the image signal of the first reference member 122a captured.

The conveyance guide 123b is one example of a member to move in association with the second imaging device 117b. The conveyance guide 123b is provided integrally with the second imaging device 117b. The conveyance guide 123b has an eave-like shape and guides the medium conveyed by the first conveyance roller 114 and the second conveyance roller 115 to between the first imaging device 117a and the second imaging device 117b. The top surface of the conveyance guide 123b has attached to one end of a not shown spring which is supported at the other end at the upper housing 102. The conveyance guide 123b is biased by that spring in a direction heading toward the first imaging device 117a side. The second imaging device 117b is provided to be able to move in the top direction in the height direction A8 perpendicular to the medium conveyance direction. On the other hand, the first imaging device 117a is fastened to the lower housing 101. When a medium having a predetermined thickness and high rigidity like thick paper, a card, or passport is conveyed, the conveyance guide 123b moves upward due to that medium. The second imaging device 117b moves upward in association with movement of the conveyance guide 123b. In this way, the second imaging device 117b is provided to be able to move in the top direction due to being pushed up by the conveyed medium.

The conveyance guide 123b is formed by a member separate from the second imaging device 117b. Note that the conveyance guide 123b may also be formed by a member integral with the second imaging device 117b. Further, the second imaging device 117b may be fastened, the first imaging device 117a may be located to be able to move in the height direction A8, and the conveyance guide 123b may be provided integrally with the first imaging device 117a. In this case, the conveyance guide 123b moves downward due to the conveyed medium, and the first imaging device 117a moves downward in association with movement of the conveyance guide 123b. Further, the conveyance guide 123b may be omitted, and the first imaging device 117a or the second imaging device 117b may be provided to be able to move in the height direction A8 due to the conveyed medium.

Note that the medium conveyance apparatus 100 may have only one of the first imaging device 117a and the second imaging device 117b and read only one surface of the medium. Further, instead of the contact optical system type CIS line sensor provided with imaging elements comprised of CMOS's, a contact optical system type CIS line sensor provided with imaging elements comprised of CCDs (charge coupled devices) may also be utilized. Further, a reduction optical system type line sensor provided with imaging elements comprised of CMOS's or CCD's may also be used. Below, the first imaging sensor 121a and the second imaging sensor 121b will sometimes be referred to all together as the "imaging sensors 121". Further, the first reference member 122a and the second reference member 122b will sometimes be referred to all together as the "reference members 122".

The third conveyance roller 118 and the fourth conveyance roller 119 are provided at the downstream side of the imaging devices 117. The third conveyance roller 118 is provided at the lower housing 101. The fourth conveyance roller 119 is provided at the upper housing 102 and is located facing the third conveyance roller 118.

The medium stacked on the stacking tray 103 is conveyed between the lower side guide 107a and the upper side guide 107b toward the medium conveyance direction A1 by the feed roller 112 rotating in the direction of the arrow A2 of FIG. 2. The brake roller 113 rotates in the direction of the arrow A3 at the time of conveyance of the medium. Due to the actions of the feed roller 112 and brake roller 113, if the stacking tray 103 has a plurality of the medium stacked on it, in the medium stacked on the stacking tray 103, only the medium contacting the feed roller 112 will be separated. Due to this, conveyance of the medium other than the separated medium is restricted (prevention of multi-feed).

The medium is guided by the lower side guide 107a and the upper side guide 107b while being fed between the first conveyance roller 114 and the second conveyance roller 115. The medium is sent between the first imaging device 117a and the second imaging device 117b by the first conveyance roller 114 and the second conveyance roller 115 respectively rotating in the directions of the arrow A4 and arrow A5. The medium read by the imaging devices 117 is ejected on the ejection tray 104 by the third conveyance roller 118 and fourth conveyance roller 119 respectively rotating in the directions of the arrow A6 and arrow A7. The feed roller 112, brake roller 113, first conveyance roller 114, second conveyance roller 115, third conveyance roller 118, and fourth conveyance roller 119 are examples of the conveying modules and convey the medium.

Figure 3:
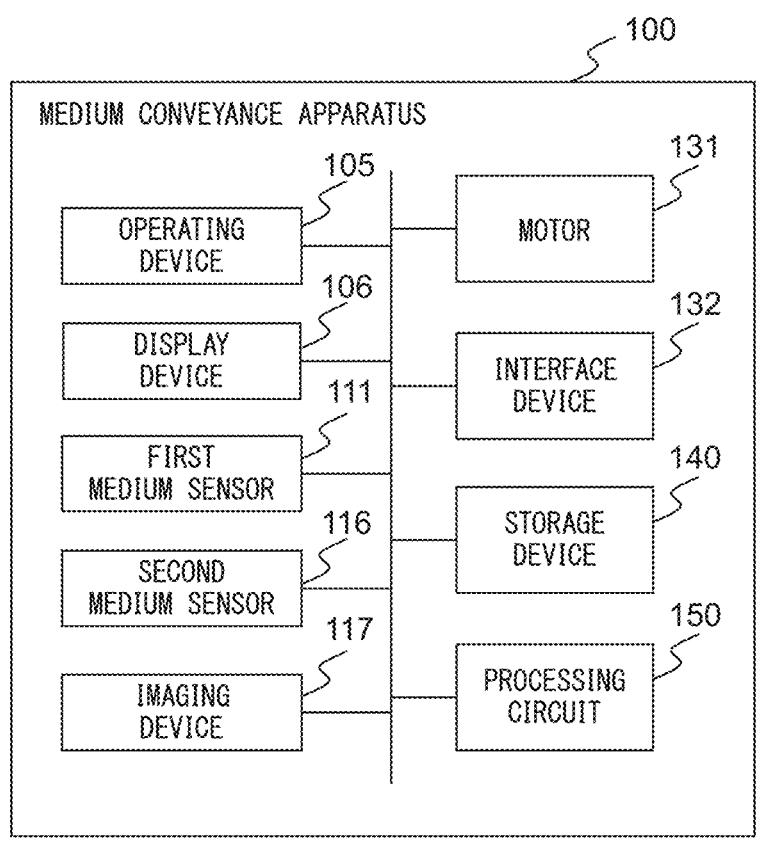
FIG. 3 is a block diagram showing the schematic constitution of a medium conveyance apparatus 100.

FIG. 3 is a block diagram showing the schematic constitution of the medium conveyance apparatus 100.

The medium conveyance apparatus 100 further has, in addition to the above-mentioned constitution, a motor 131, interface device 132, storage device 140, processing circuit 150, etc.

The motor 131 includes one or more motors and makes the feed roller 112, brake roller 113, first conveyance roller 114, second conveyance roller 115, third conveyance roller 118, and fourth conveyance roller 119 rotate by control signals from the processing circuit 150 so as to convey the medium.

The interface device 132 has an interface circuit based on for example a USB or other serial bus and is electrically connected with a not shown information processing apparatus (for example, a personal computer, mobile information terminal, etc.) to transmit and receive images and various information. Further, instead of the interface device 132, a communication module having an antenna transmitting and receiving wireless signals and a wireless communication interface circuit for transmitting and receiving signals through a wireless communication line in accordance with a predetermined communication protocol may be used. The predetermined communication protocol is for example a wireless LAN (local area network).

The storage device 140 has a RAM (random access memory), ROM (read only memory), or other memory device, hard disk or other fixed disk device, flexible disk, optical disk, or other portable storage device, etc. Further, the storage device 140 stores computer programs, databases, tables, etc., used for various processing of the medium conveyance apparatus 100. The computer programs may be installed on the storage device 140 from a computer-readable, non-transitory medium such as a CD-ROM (compact disc read only memory), DVD-ROM (digital versatile disc read only memory), etc., by using a well-known setup program, etc.

Further, the storage device 140 stores as data a region table showing low reliability regions in the input image. Low reliability regions are regions having a high possibility of fluctuation of the tonal values of the pixels in which the reference members 122 is captured, in the sub scan direction in the input image. The processing circuit 150 detects end parts without using edge pixels detected from the low reliability regions when detecting the end parts in a main scan direction of the medium from input image. Details of the region table will be explained later. The storage device 140 is one example of the storage device.

The processing circuit 150 operates based on programs stored in advance in the storage device 140. Note that instead of the processing circuit 150, a DSP (digital signal processor), LSI (large scale integrated circuit), ASIC (application specific integrated circuit), FPGA (field-programmable gate array), etc., may also be used.

The processing circuit 150 is connected with the operating device 105, display device 106, first medium sensor 111, second medium sensor 116, imaging devices 117, motor 131, interface device 132, storage device 140, etc., and control these parts. The processing circuit 150 controls the drive by the motor 131, controls imaging by the imaging devices 117, etc., acquires images, and transmits them through the interface device 132 to a not shown information processing apparatus. Further, the processing circuit 150 detects end parts of the medium based on images captured by the imaging devices 117.

FIG. 4 is a view showing the schematic constitutions of the storage device 140 and processing circuit 150.

As shown in FIG. 4, the storage device 140 stores a setting program 141, control program 142, image acquisition program 143, edge pixel detection program 144, end part detection program 145, medium width detection program 146, output control program 147, fluctuation region detection program 148, etc. These programs are function modules loaded by software operating on a processor. The processing circuit 150 reads the programs stored in the storage device 140 and operates in accordance with the read programs. Due to this, the processing circuit 150 functions as a setting module 151, control module 152, image acquisition module 153, edge pixel detection module 154, end part detection module 155, medium width detection module 156, output control module 157, and fluctuation region detection module 158.

FIG. 5 is a view showing one example of the data structure of the region table.

As shown in FIG. 5, the region table stores the low reliability regions for the different combinations of imaging devices 117 and conveying modules. The imaging devices 117 for which the low reliability regions are set include the first imaging device 117a and a second imaging device 117b. The conveying modules for which the low reliability regions are set include the pair of the feed roller 112 and brake roller 113, the pair of the first conveyance roller 114 and second conveyance roller 115, and the pair of the third conveyance roller 118 and fourth conveyance roller 119. The low reliability regions are set based on the positional relationship of the imaging positions of the imaging devices 117 and the arrangement positions of the conveying modules. As the low reliability regions, regions captured by the imaging devices 117 in the input image when the medium nipped by the conveying modules contacts the conveyance guide 123b are set. Note that if the conveyance guide 132 is omitted, as the low reliability regions, regions captured by the imaging devices 117 in the input image when the medium nipped by the conveying modules contacts the second imaging device 117b are set. Alternatively, as the low reliability regions, regions captured by the imaging devices 117 in the input image when the front end or the back end of the conveyed medium passes the conveying modules are set.

FIG. 6A, FIG. 6B, FIG. 7A, and FIG. 7B are schematic views for explaining the low reliability regions.

Figure 6A:
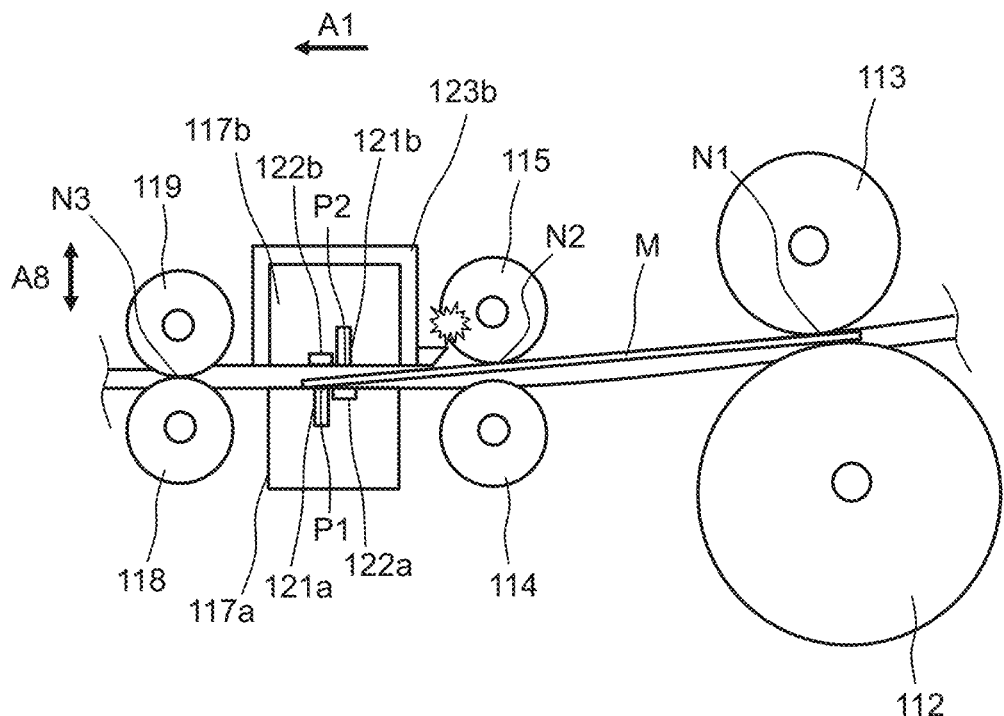
FIG. 6A is a schematic view for explaining a low reliability region.

FIG. 6A is a schematic view for explaining images captured by the imaging devices 117 when a medium nipped by the feed roller 112 and brake roller 113 contacts the second imaging device 117b.

As shown in FIG. 6A, a nip position N1 of the roller 112 and brake roller 113 in the height direction A8 is located at the upper side of the imaging surface (conveyance surface) of the first imaging device 117a. If a medium having a predetermined thickness and having rigidity is conveyed, the conveyed medium M is nipped by the feed roller 112 and brake roller 113 and is conveyed so that the front end moves along the imaging surface of the first imaging device 117a. In other words, the medium M is conveyed so that the front end is inclined to the bottom side. For this reason, the medium M contacts the end parts of the second imaging device 117b (conveyance guide 123b) at the upstream side at a specific timing, and the second imaging device 117b is pushed up by the medium M and moves in the top direction. If the second imaging device 117b moves in the top direction, the distance between the first imaging device 117a and the second imaging device 117b increases. Therefore, inside the input image, the tonal values of the pixels of the second reference member 122b captured by the first imaging sensor 121a around this timing and the tonal values of the pixels of the first reference member 122a captured by the second imaging sensor 121b around this timing fluctuate.

The setting module 151 sets as the low reliability regions the regions captured by the imaging devices 117 when a medium with a front end contacting the imaging surface of the first imaging device 117a and nipped by the feed roller 112 and brake roller 113 contacts the end part of the second imaging device 117b at the upstream side. The setting module 151 sets as the front end position of the medium the position where the line passing through the nip position N1 of the feed roller 112 and brake roller 113 and the end part of the second imaging device 117b at the upstream side abuts against the imaging surface of the first imaging device 117a. The setting module 151 sets as low reliability positions the positions on the back end of the medium side of positions where the front end of the medium is included by distances corresponding to distances between the set front end position and the imaging positions P1, P2 of the imaging devices 117 in the vertical direction (sub scan direction) inside the input image. Further, the setting module 151 sets as the low reliability regions the regions of a predetermined range (for example 5 pixels) centered about the set low reliability positions in the vertical direction inside the input image. Note that due to the conveyance speed of the medium or the members of the medium conveyance path, after the second imaging device 117b moves in the top direction, it may bounce (vibrate) and the time periods during which the tonal values of the reference members 122 inside the input image fluctuate may be longer. The predetermined range is set considering the effects of the conveyance speed of the medium, the members of the medium conveyance path, etc.

Due to this, the medium conveyance apparatus 100 can keep regions in which the tonal values of the background in the input image fluctuate from being mistakenly detected as edges of the medium.

Figure 6B:
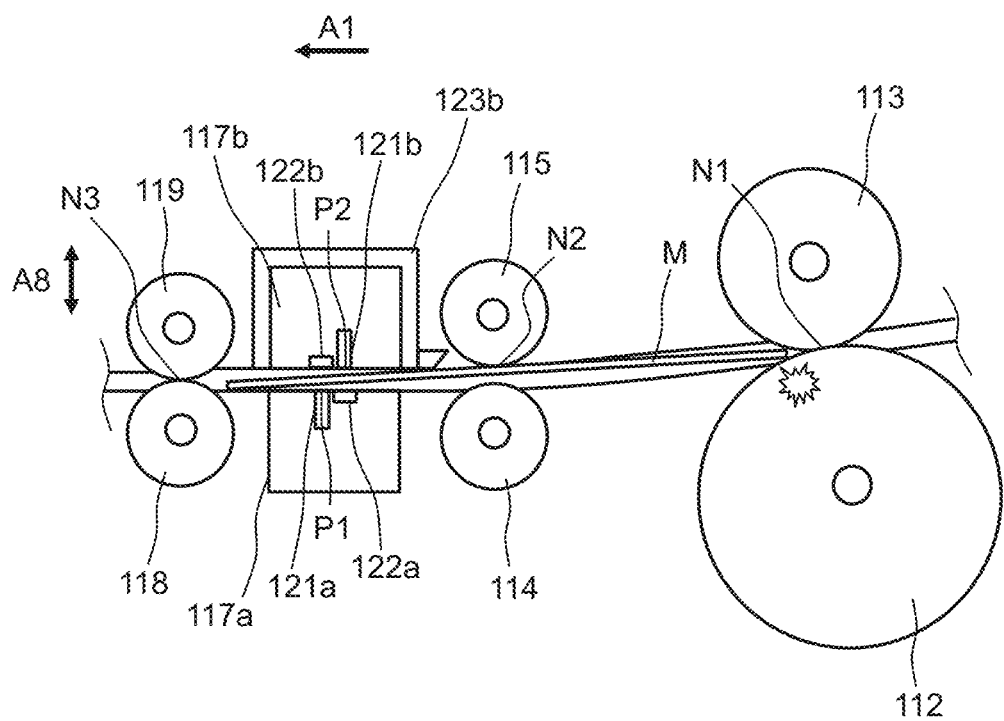
FIG. 6B is a schematic view for explaining a low reliability region.

FIG. 6B is a schematic view for explaining the regions captured by the imaging devices 117 inside the input image when the back end of a conveyed medium passes the feed roller 112 and brake roller 113.

As shown in FIG. 6B, when the back end of the medium M passes the nip position N1 of the feed roller 112 and brake roller 113, the medium M vibrates due to the shock of separation from the feed roller 112 and the brake roller 113. For this reason, the second imaging device 117b pushed up by the medium M vibrates in association with the medium M. When the second imaging device 117b vibrates, the distance between the first imaging device 117a and the second imaging device 117b changes. Therefore, inside the input image, the tonal values of the pixels of the second reference member 122b captured by the first imaging sensor 121a around this timing and the tonal values of the pixels of the first reference member 122a captured by the second imaging sensor 121b around this timing fluctuate.

The setting module 151 sets as the low reliability regions the regions captured by the imaging devices 117 when the back end of the conveyed medium passes the feed roller 112 and brake roller 113. The setting module 151 sets as the front end position of the medium the position on the downstream side of the nip position N1 of the feed roller 112 and brake roller 113 by exactly the amount of the long side size (or the amount of the short side size) of an ID card prescribed by ISO/IEC7810. The setting module 151 sets as low reliability positions the positions on the back end of the medium side of positions where the front end of the medium is included by distances corresponding to distances between the set front end position and the imaging positions P1, P2 of the imaging devices 117 in the vertical direction (sub scan direction) inside the input image. Further, the setting module 151 sets as the low reliability regions the regions of a predetermined range centered about the set low reliability positions in the vertical direction inside the input image. Due to this, the medium conveyance apparatus 100 can be kept from mistakenly detecting regions with tonal values of the background in input image which fluctuate as edges of the medium.

Figure 7A:
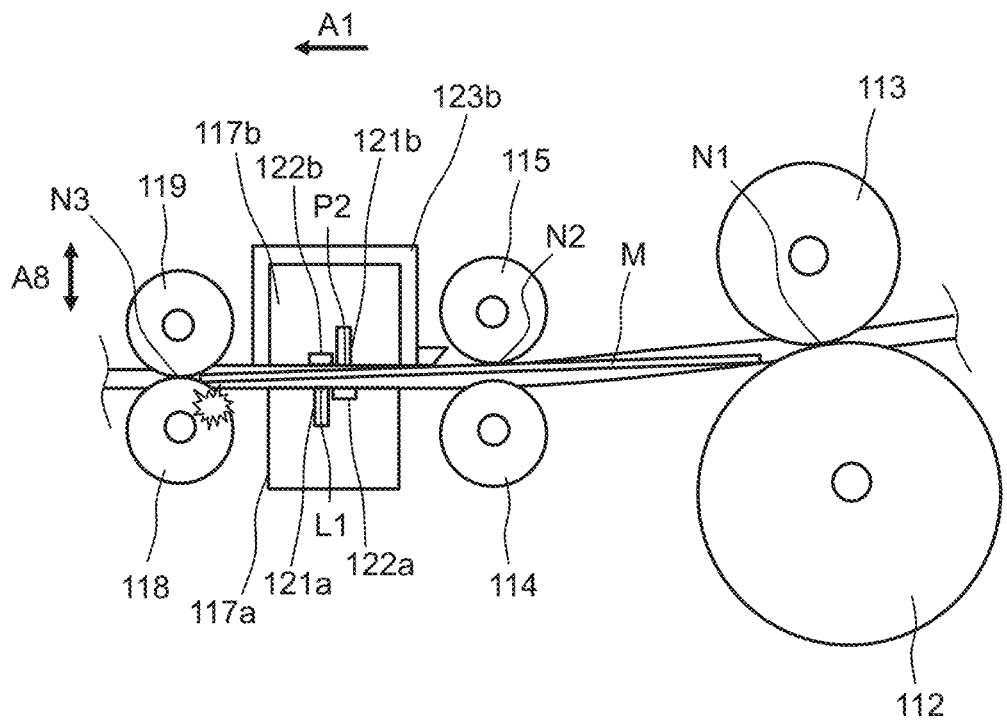
FIG. 7A is a schematic view for explaining a low reliability region.

FIG. 7A is a schematic view for explaining regions captured by the imaging devices 117 inside input image when the front end of the conveyed medium passes the third conveyance roller 118 and fourth conveyance roller 119.

As shown in FIG. 7A, the front end of the medium M strikes the third conveyance roller 118 or fourth conveyance roller 119 and is guided to the nip position N3 of the third conveyance roller 118 and fourth conveyance roller 119 when passing the third conveyance roller 118 and fourth conveyance roller 119. The medium M vibrates due to the shock caused by striking the third conveyance roller 118 or fourth conveyance roller 119, so the second imaging device 117b pushed up by the medium M vibrates in association with the medium M.

The setting module 151 sets as the low reliability regions the regions captured by the imaging devices 117 when the front end of the conveyed medium passes the third conveyance roller 118 and fourth conveyance roller 119. The setting module 151 sets as the front end position of the medium the nip position N3 of the third conveyance roller 118 and fourth conveyance roller 119. The setting module 151 sets as low reliability positions the positions on the back end of the medium side of positions where the front end of the medium is included by distances corresponding to distances between the set front end position and the imaging positions P1, P2 of the imaging devices 117 in the vertical direction (sub scan direction) inside the input image. Further, the setting module 151 sets as the low reliability regions the regions in predetermined ranges centered about the set low reliability positions in the vertical direction inside the input image. Due to this, the medium conveyance apparatus 100 can keep regions in which the tonal values of the background in the input image fluctuate from being mistakenly detected as edges of the medium.

Figure 7B:
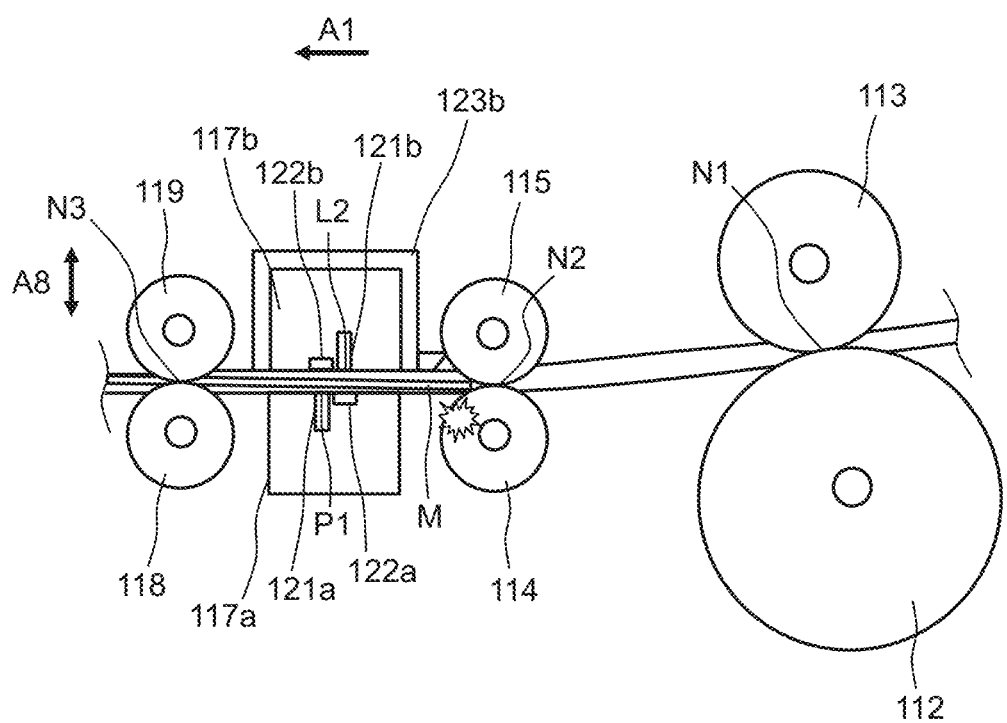
FIG. 7B is a schematic view for explaining a low reliability region.

FIG. 7B is a schematic view for explaining regions captured by the imaging devices 117 inside input image when the back end of the conveyed medium passes the first conveyance roller 114 and the second conveyance roller 115.

As shown in FIG. 7B, the medium M vibrates due to the impact of separation from the first conveyance roller 114 and the second conveyance roller 115 when the back end of the medium M passes the nip position N2 of the first conveyance roller 114 and the second conveyance roller 115. For this reason, the second imaging device 117b pushed up by the medium M vibrates in association with the medium M.

The setting module 151 sets as the low reliability regions the regions captured by imaging devices 117 when the back end of the conveyed medium passes the first conveyance roller 114 and the second conveyance roller 115. The setting module 151 sets as the front end position of the medium the position on the downstream side of the nip position N2 of the first conveyance roller 114 and the second conveyance roller 115 by exactly the amount of the long side size (or the amount of the short side size) of an ID card prescribed by ISO/IEC7810. The setting module 151 sets as low reliability positions the positions on the back end of the medium side of positions where the front end of the medium is included by distances corresponding to distances between the set front end position and the imaging positions P1, P2 of the imaging devices 117 in the vertical direction (sub scan direction) inside the input image. Further, the setting module 151 sets as the low reliability regions the regions of a predetermined range centered about the set low reliability positions in the vertical direction inside the input image. Due to this, the medium conveyance apparatus 100 can keep regions in which the tonal values of the background in the input image fluctuate from being mistakenly detected as edges of the medium.

Note that the setting module 151 need not set all of the above regions as the low reliability regions. At least one region may be set as the low reliability region. In particular, in the region captured when the medium contacts the second imaging device 117b, which is explained in FIG. 6A, the amount of fluctuation of the tonal value of the background is small. For this reason, the setting module 151 need not set the region as the low reliability region.

Figure 8:
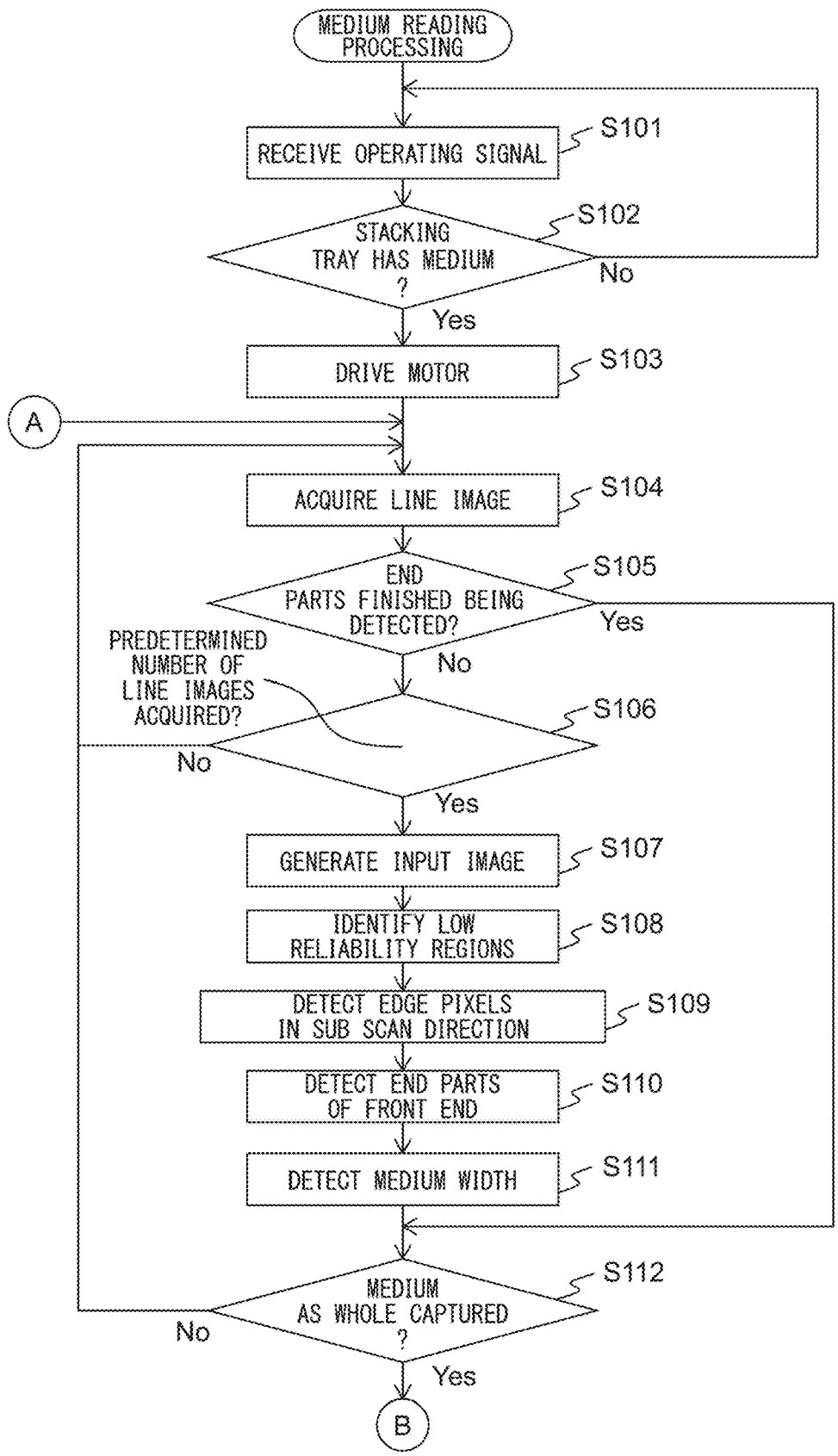
FIG. 8 is a flow chart showing an example of the operation of medium reading processing.
Figure 9:
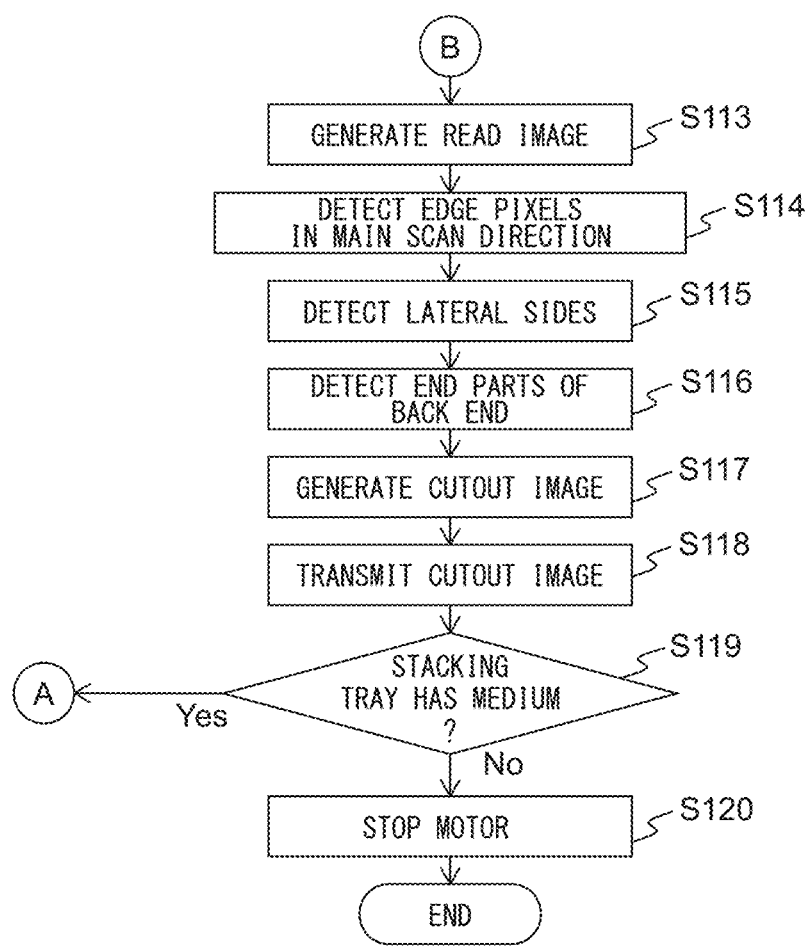
FIG. 9 is a flow chart showing an example of the operation of medium reading processing.

FIG. 8 and FIG. 9 are flow charts showing an example of the operation of the medium reading processing of the medium conveyance apparatus 100.

Below, referring to the flow charts shown in FIG. 8 and FIG. 9, an example of the operation of reading processing of the medium conveyance apparatus 100 will be explained. Note that the flow of the operation explained below is mainly performed by the processing circuit 150 in cooperation with the elements of the medium conveyance apparatus 100 based on a program stored in advance in the storage device 140. The flow of operation shown in FIG. 8 and FIG. 9 is performed periodically.

First, the control module 152 stands by until an instruction to read a medium is input by a user using the operating device 105 and receiving an operating signal for instructing reading of the medium from the operating device 105 (step S101).

Next, the control module 152 determines whether the stacking tray 103 has the medium stacked on it, based on the first medium signal received from the first medium sensor 111 (step S102).

If the stacking tray 103 does not have the medium stacked on it, the control module 152 returns the processing to step S101 and stands by until newly receiving an operating signal from the operating device 105.

On the other hand, if the stacking tray 103 has the medium stacked on it, the control module 152 drives the motor 131 to make the feed roller 112, brake roller 113, and first to fourth conveyance rollers 114, 115, 118, and 119 rotate and convey the medium (step S103).

Next, the image acquisition module 153 makes the imaging devices 117 capture the conveyed medium to acquire line images (step S104). Note that the image acquisition module 153 may determine whether the front end of the medium has passed the position of the second medium sensor 116 based on the second medium signal received from the second medium sensor 116 and may make the imaging devices 117 start capture when the front end of the medium passes the position of the second medium sensor 116. The image acquisition module 153 periodically acquires the second medium signal from the second medium sensor 116 and determines that the front end of the medium has passed the position of the second medium sensor 116 when the signal value of the second medium signal changes from a value showing a medium is not present to a value showing a medium is present.

Next, the image acquisition module 153 determines whether the end parts in the main scan direction of the front end of the medium have been detected by the end part detection module 155 (step S105). The end parts in the main scan direction of the front end of the medium are detected at the later explained step S110. If the end parts in the main scan direction of the front end of the medium have been detected, the image acquisition module 153 advances the processing to step S112.

On the other hand, if the end parts in the main scan direction of the front end of the medium have not yet been detected, the image acquisition module 153 determines whether predetermined numbers of line images have been acquired from the imaging devices 117 (step S106). The predetermined numbers are set in advance to values of 1 or more (for example, 100) by which the end parts in the main scan direction of the front end of the medium are considered to be reliably included. The predetermined numbers may be set to values by which the medium as a whole is included. The medium conveyance apparatus 100 can more reliably detect the end parts the larger the predetermined numbers and can detect the end parts faster the smaller the predetermined numbers. If the predetermined numbers of line images have not yet been acquired, the image acquisition module 153 returns the processing to step S104 and repeats the processing of steps S104 to S106.

On the other hand, if acquiring the predetermined numbers of line images, the image acquisition module 153 combines the predetermined numbers of line images to generate input image (step S107). In other words, the input image is an image of the medium captured by the imaging devices 117 and generated by the image acquisition module 153. Note that the imaging devices 117 may combine the predetermined numbers of line images to generate input image and the image acquisition module 153 may acquire the input image from the imaging devices 117.

Figure 10:
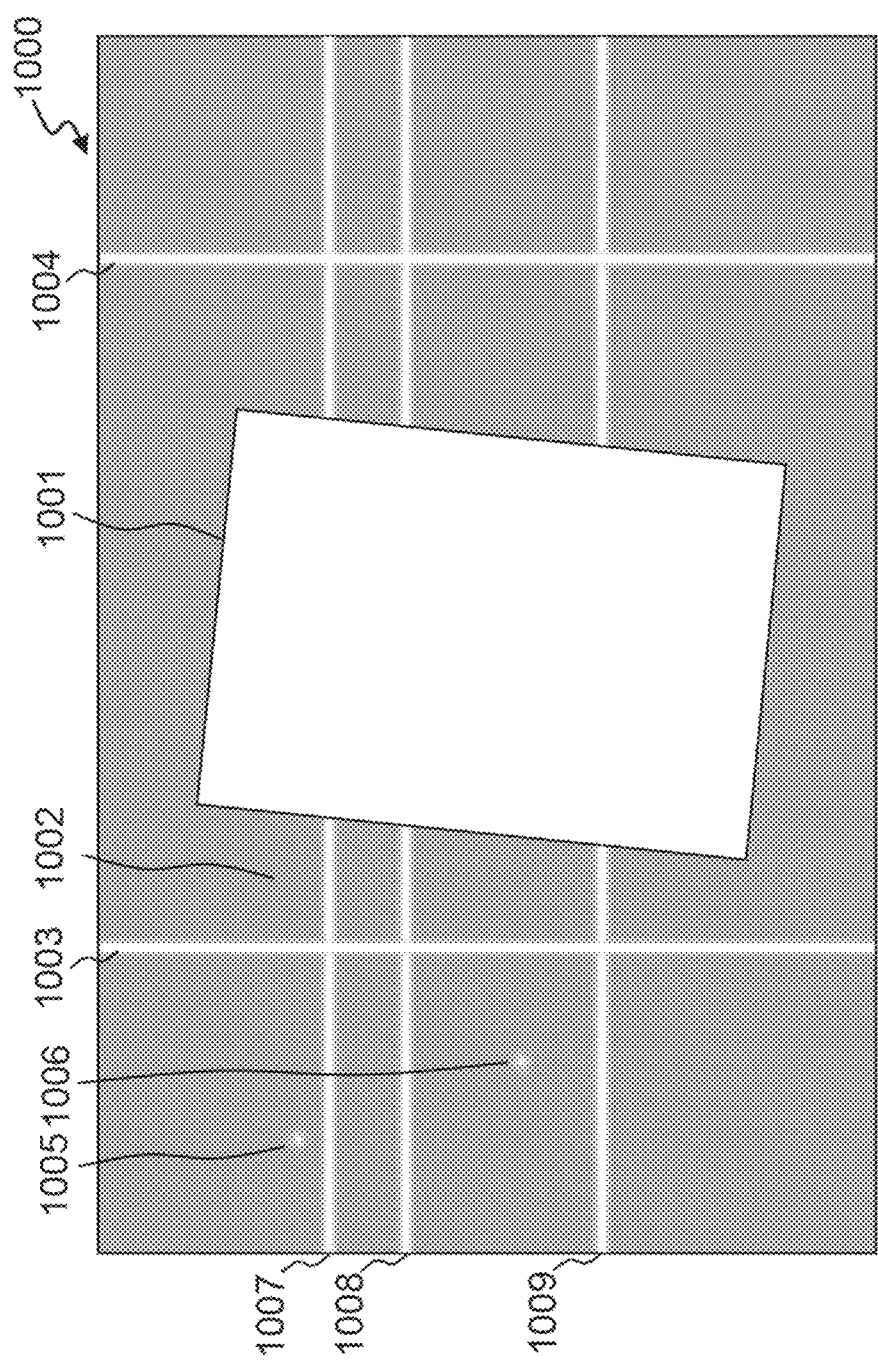
FIG. 10 is a schematic view showing one example of an input image 1000.

FIG. 10 is a schematic view showing one example of input image 1000.

The input image 1000 shown in FIG. 10 include the medium 1001. Further, the reference member 122 is included as a background 1002. The background 1002 includes the vertical stripe noises 1003, 1004, sudden noises 1005, 1006, and horizontal stripe noises 1007, 1008, 1009. The vertical stripe noises 1003, 1004 are noises generated due to paper powder, dust, paste, or other foreign matter deposited on the imaging surfaces (glass surfaces) of the imaging devices 117 or uneven sensitivity of the line sensors. "Sudden noise" is noise generated when amplifying electrical signals output from imaging elements inside the imaging devices 117 or noise generated due to differences in the characteristics of the individual parts, etc. "Horizontal stripe noise" is noise generated due to the second imaging device 117b moving in the height direction A8.

The horizontal stripe noise 1007 is noise generated when the back end of the medium 1001 passes the feed roller 112 and brake roller 113. The horizontal stripe noise 1008 is noise generated when the front end of the medium 1001 passes the third conveyance roller 118 and fourth conveyance roller 119. The horizontal stripe noise 1009 is noise generated when the back end of the medium 1001 passes the first conveyance roller 114 and the second conveyance roller 115. In the example shown in FIG. 10, in the region captured when the medium nipped between the feed roller 112 and brake roller 113 contacts the second imaging device 117b, the amount of fluctuation of the tonal values is sufficiently small and no horizontal stripe noise is generated.

Next, the edge pixel detection module 154 reads out the region table from the storage device 140 and identifies the low reliability regions (step S108). In the example explained using FIG. 10, regions captured by the imaging devices 117 when the back end of the medium passes the feed roller 112 and brake roller 113, when the front end of the medium passes the third conveyance roller 118 and fourth conveyance roller 119, and when the back end of the medium passes the first conveyance roller 114 and the second conveyance roller 115, inside the input image, are set as the low reliability regions. On the other hand, the regions captured by the imaging devices 117 when the medium nipped at the conveying modules contacts the second imaging device 117b, inside the input image, are not set as the low reliability region.

Next, the edge pixel detection module 154 detects pluralities of edge pixels in the sub scan direction from the input image (step S109). The edge pixel detection module 154 detects the edge pixels in the sub scan direction based on the tonal values of the pluralities of pixels with positions in the main scan direction which are the same as each other and with distances in the sub scan direction which are within a predetermined range of each other inside the input image.

The edge pixel detection module 154 calculates an absolute value of the difference of the tonal values of two adjoining pixels inside the input image (below, referred to as the "adjoining difference value") in order from the top side for each vertical line extending in the vertical direction (sub scan direction). The edge pixel detection module 154 detects as edge pixels the pixels with an adjoining difference value which is over the tone threshold value inside the vertical lines. The edge pixel detection module 154 determines as top end edge pixels the edge pixels first detected inside the vertical lines, i.e., the pixels positioned at the top-most side, and detects them as edge pixels in the sub scan direction. The tonal value is a brightness value or color value (R value, G value, or B value), etc. The tone threshold value is, for example, set to the difference of the brightness value (for example, 20) enabling a person to be able to visually determine a difference of brightness of the image.

Note that the edge pixel detection module 154 may calculate as the adjoining difference value the absolute value of the difference of tonal values of two pixels separated by exactly a predetermined distance from a pixel inside the input image in the vertical direction. Further, the edge pixel detection module 154 may compare the tonal values of the pixels inside the input image with a threshold value to thereby detect the edge pixels. For example, the edge pixel detection module 154 detects specific pixels as edge pixels if the tonal values of the specific pixels are less than the threshold value and the tonal values of pixels adjoining the specific pixels or pixels separated from them by exactly a predetermined distance in the vertical direction are the threshold value or more.

Further, the edge pixel detection module 154 need not detect the edge pixels in the sub scan direction for all of the pixels inside the input image and may detect the edge pixels in the sub scan direction for every certain interval (for example, 4 pixels) in the main scan direction inside the input image. The edge pixel detection module 154 detects the target lines for detecting the edge pixels in the sub scan direction for every certain interval from among the vertical lines inside the input image and detects the edge pixels in the sub scan direction for the extracted target lines. Due to this, the edge pixel detection module 154 can reduce the time period required for detecting the end parts of the medium and lower the processing time and processing load of the medium reading processing.

The edge pixel detection module 154 identifies as positions at which the front end of the medium is included the positions of the edge pixels detected at the top-most side in the sub scan direction inside the input image and identifies the regions set as the low reliability regions with reference to the identified positions. The edge pixel detection module 154 does not detect edge pixels in the sub scan direction from the identified low reliability regions but detects the edge pixels in the sub scan direction from only regions not including the low reliability regions inside the input image.

Note that the edge pixel detection module 154 may identify the low reliability regions captured by the imaging devices 117 when the back end of the medium passes the feed roller 112 and brake roller 113 inside the input image, based on the first medium signal received from the first medium sensor 111. In this case, the edge pixel detection module 154 periodically acquires the first medium signal from the first medium sensor 111. When the signal value of the first medium signal changes from a value showing a medium is present to a value showing a medium is not present, the edge pixel detection module 154 determines that the back end of the medium is positioned right before the nip position of the feed roller 112 and brake roller 113. The edge pixel detection module 154 identifies as the low reliability regions the regions inside input image captured by the imaging devices 117 within a certain time period from when determining that the back end of the medium is positioned right before the nip position of the feed roller 112 and brake roller 113.

Similarly, the edge pixel detection module 154 may identify the low reliability regions captured by the imaging devices 117 when the back end of the medium passes the first conveyance roller 114 and the second conveyance roller 115 inside the input image based on the first medium signal received from the first medium sensor 111. The edge pixel detection module 154 determines that the back end of the medium is positioned right before the first conveyance roller 114 and the second conveyance roller 115 when a predetermined time period corresponding to a predetermined amount of movement of the medium elapses from when determining that the back end of the medium is positioned right before the nip position of the feed roller 112 and brake roller 113. The edge pixel detection module 154 determines as the low reliability regions the regions captured by the imaging devices 117 within a certain time period from when determining that the back end of the medium is positioned right before the first conveyance roller 114 and the second conveyance roller 115 inside input image.

Figure 11:
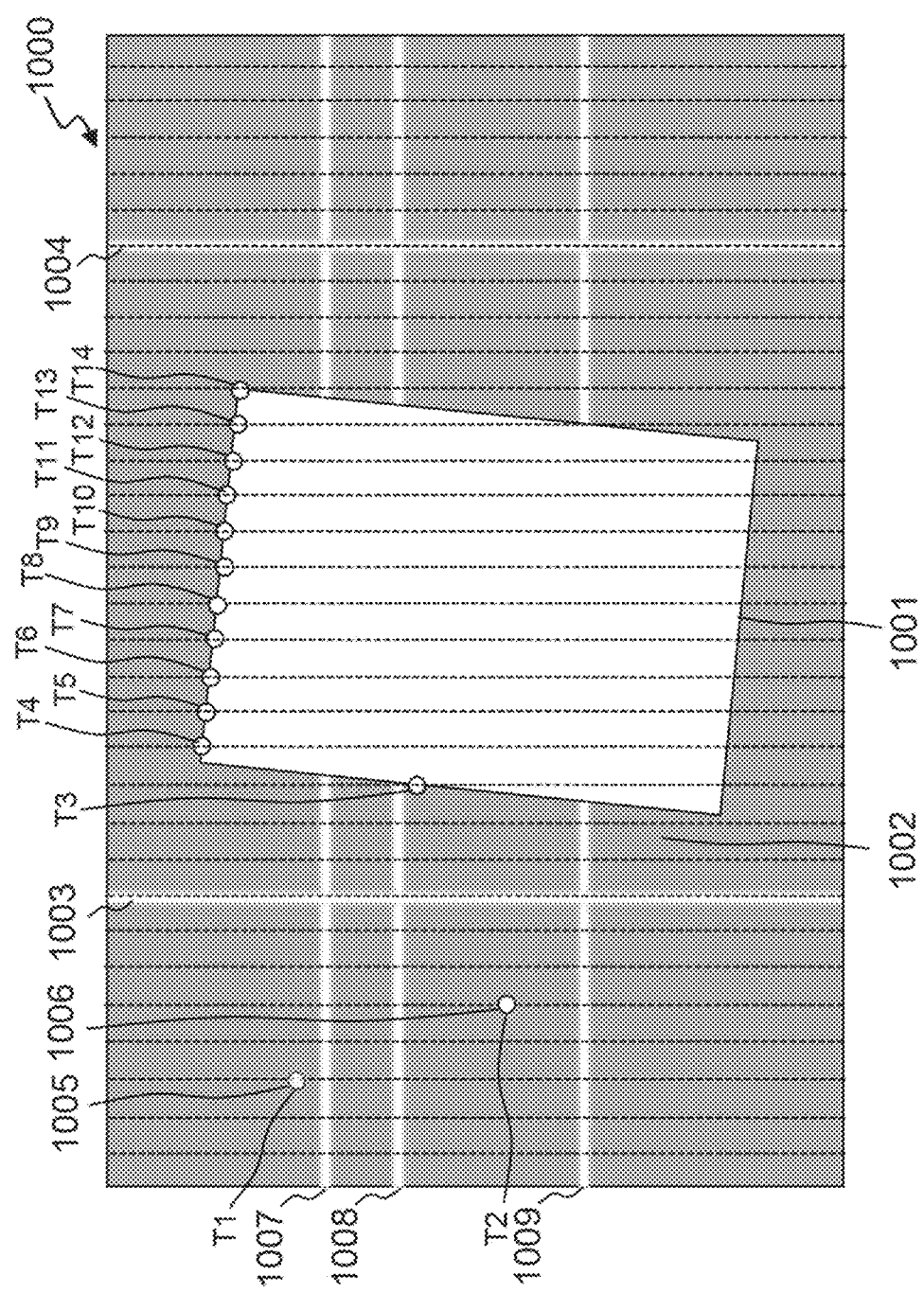
FIG. 11 is a schematic view for explaining top end edge pixels.

FIG. 11 is a schematic view for explaining the top end edge pixels.

FIG. 11 shows the input image 1000 shown in FIG. 10. In FIG. 11, the broken lines extending in the vertical direction show the vertical lines extracted as the target lines. In the example shown in FIG. 11, the pixels T1 to T14 are detected as top end edge pixels. The top end edge pixels T1, T2 are respectively pixels corresponding to the sudden noises 1005, 1006. The top end edge pixel T3 is a pixel corresponding to the left side of the medium. The top end edge pixels T4 to T14 are pixels corresponding to the top side of the medium. As shown in FIG. 11, the vertical stripe noises 1003, 1004 extend in the vertical direction and the tonal values of the pixels in the vertical stripe noises 1003, 1004 are within a certain range, so the pixels corresponding to the vertical stripe noises 1003, 1004 are not detected as the top end edge pixels. Note that the vertical stripe noise generated or extinguished during the reading (during conveyance of the medium) has changes in tonal values at its end parts, so is detected in the same way as sudden noises 1005, 1006. Such vertical stripe noise generated or extinguished during the reading (during conveyance of the medium) is processed in the same way as the sudden noises 1005, 1006 in the later explained processing and is not mistakenly detected as an end part of the medium. Further, the vicinities of the horizontal stripe noises 1007, 1008, 1009 are set as the low reliability regions, so the pixels corresponding to the horizontal stripe noises 1007, 1008, 1009 are not detected as the top end edge pixels.

Next, the end part detection module 155 detects the end parts in the main scan direction of the front end of the medium, based on the edge pixels in the sub scan direction detected from regions not including the low reliability regions inside the input image (step S110). The end part detection module 155 detects the end parts in the main scan direction of the front end of the medium, based on the positional relationship among the pluralities of edge pixels in the sub scan direction detected by the edge pixel detection module 154.

For example, the end part detection module 155 calculates, as the positional relationship among the pluralities of edge pixels in the sub scan direction, the number or ratio of edge pixels in the sub scan direction in a certain range in the main scan direction, i.e., the density of edge pixels in the sub scan direction in a certain range in the main scan direction. The end part detection module 155 calculates the number or ratio of target lines in which edge pixels in the sub scan direction are detected, among the target lines positioned in a certain range of the target lines for each target line extracted from the vertical lines. The certain range is set so that the number of the target for which the number or ratio is calculated, is a predetermined number (for example 5) of 2 or more. The end part detection module 155 extracts the group of target lines comprised of the consecutive target lines with calculated values of the threshold value (for example 3) or more or the target lines with calculated ratios of the threshold value (for example 0.6) or more adjoining each other.

The end part detection module 155 detects as the range of the front end of the medium in the main scan direction the range of the group of target lines with the greatest number of target lines included among the extracted groups of target lines in the main scan direction. Note that the end part detection module 155 may detect as the range of the front end of the medium in the main scan direction the range reducing the detected range by exactly a predetermined margin or the range expanding the detected range by exactly a predetermined margin. The end part detection module 155 detects as the end parts in the main scan direction of the front end of the medium the positions of the two ends of the group of target lines detected as the range of the front end of the medium in the main scan direction.

In the example shown in FIG. 11, the range of the target line including the top end edge pixel T3 to the target line including the top end edge pixel T14 is detected as the range of the front end of the medium. Further, the target line including the top end edge pixel T3 and the target line including the top end edge pixel T14 are detected as the end parts in the main scan direction of the front end of the medium. In other words, the pixels corresponding to the vertical stripe noises 1003, 1004 are not detected as the top end edge pixels, so are not included in the range of the front end of the medium. Further, the target lines including the top end edge pixels T1, T2 corresponding to the sudden noises 1005, 1006 are positioned scattered, so they are not included in the range of the front end of the medium. Further, the pixels corresponding to the horizontal stripe noises 1007, 1008, 1009 are not detected as top end edge pixels, so are not included in the range of the front end of the medium. Further, even if the difference between the tonal values of the background and medium were small at part of the target lines corresponding to the front end of the medium and the top end edge pixels were not detected, if the top end edge pixels are detected at the target lines in the surroundings, that part of the target lines also is included in the range of the front end of the medium.

The end part detection module 155 can use the number or ratio of the edge pixels in the sub scan direction in a certain range to reduce the effects of noise and the effects of missed detection of the top end edge pixels so as to highly precisely detect the range of the front end of the medium and its end parts. In particular, the horizontal stripe noise is detected as the edge pixels in the sub scan direction, so when utilizing the edge pixels in the sub scan direction to utilize the range of the front end of the medium, this becomes a factor behind mistakenly detecting the range of the front end of the medium. The end part detection module 155 can remove the regions in which horizontal stripe noise is generated, from the regions for detecting the top end edge pixels and thereby utilize the top end edge pixels to highly precisely detect the range of the front end of the medium and the its end parts.

Note that the end part detection module 155 may detect the edge pixels in the sub scan direction consecutively detected in the main scan direction as the positional relationship among the pluralities of edge pixels in the sub scan direction. In this case, the end part detection module 155 calculates the number (consecutive number) of edge pixels in the sub scan direction consecutively detected in the main scan direction. The end part detection module 155 extracts a group of target lines comprised of a predetermined number (for example, three) or more of consecutive adjoining target lines with detected edge pixels in the sub scan direction.

The end part detection module 155 detects as the range of the front end of the medium in the main scan direction the range of the group of target lines with the greatest number of target lines included among the extracted groups of target lines in the main scan direction. Note that the end part detection module 155 may detect as the range of the front end of the medium in the main scan direction the range reducing the detected range by exactly a predetermined margin or the range expanding the detected range by exactly a predetermined margin. The end part detection module 155 detects as the end parts in the main scan direction of the front end of the medium the positions of the two ends of the group of target lines detected as the range of the front end of the medium in the main scan direction.

In the example shown in FIG. 11, the range of the target line including the top end edge pixel T3 to the target line including the top end edge pixel T14 is detected as the range of the front end of the medium. Further, the target line including the top end edge pixel T3 and the target line including the top end edge pixel T14 are detected as end parts in the main scan direction of the front end of the medium. In other words, pixels corresponding to the vertical stripe noises 1003, 1004 are not detected as the top end edge pixels, so are not included in the range of the front end of the medium. Further, the target lines including the top end edge pixels T1, T2 corresponding to the sudden noises 1005, 1006 are positioned scattered, so are not included in the range of the front end of the medium. Further, the pixels corresponding to the horizontal stripe noises 1007, 1008, 1009 are not detected as top end edge pixels, so are not included in the range of the front end of the medium.

In this case, if the top end edge pixels are not detected at some of the target lines in the target lines corresponding to the front end of the medium, the range of the front end of the medium is not correctly detected. However, the consecutive number of edge pixels in the sub scan direction is calculated in a short time period by the number or ratio of edge pixels in the sub scan direction in a certain range. Therefore, the end part detection module 155 can reduce the effect of noise while detecting the range of the front end of the medium and its end parts in a shorter time period and with a lower load based on the edge pixels in the sub scan direction consecutively detected in the main scan direction. In particular, the end part detection module 155 can remove the regions in which horizontal stripe noise is generated, from the regions for detecting the top end edge pixels and thereby utilize the top end edge pixels to highly precisely detect the range of the front end of the medium and its end parts.

Further, the end part detection module 155 may calculate the closeness of positions in the sub scan direction as the positional relationship among a plurality of edge pixels in the sub scan direction. For example, the end part detection module 155 calculates as the closeness of the positions in the sub scan direction the distance in the sub scan direction among the plurality of edge pixels in the sub scan direction. The end part detection module 155 extracts the group of target lines in which the target lines with edge pixels in the sub scan direction detected are positioned within a first distance from each other in the main scan direction and with edge pixels in the sub scan direction detected in the target lines positioned within a second distance in the sub scan direction. The first distance is, for example, set to a predetermined multiple (for example, 2×) of the distance between target lines adjoining each other. The second distance is, for example, set to a predetermined multiple (for example, 2×) of the distance between target lines adjoining each other.

The end part detection module 155 detects the range of the group of target lines in the main scan direction with the greatest number of target lines included among the extracted groups of target lines as the front end range of the medium in the main scan direction. Note that the end part detection module 155 may detect the range reducing the detected range by exactly a predetermined margin or the range expanding the detected range by exactly a predetermined margin as the front end range of the medium in the main scan direction. The end part detection module 155 detects the positions of the two ends of the group of target lines detected as the range of the front end of the medium in the main scan direction as the end parts in the main scan direction of the front end of the medium.

In the example shown in FIG. 11, the range of the target line including the top end edge pixels T4 to the target line including the top end edge pixel T14 is detected as the range of the front end of the medium. In other words, the pixels corresponding to the vertical stripe noises 1003, 1004 are not detected as top end edge pixels, so are not included in the range of the front end of the medium. Further, the target lines including the top end edge pixels T1, T2 corresponding to the sudden noises 1005, 1006 are positioned scattered, so are not included in the range of the front end of the medium. Further, the pixels corresponding to the horizontal stripe noises 1007, 1008, 1009 are not detected as top end edge pixels, so are not included in the range of the front end of the medium. Further, the top end edge pixel T3 corresponding to the left side of the medium 1001 is separated in the main scan direction from the top end edge pixels T4, T5 positioned in the vicinity in the sub scan direction, so the target line including the top end edge pixel T3 is not included in the range of the front end of the medium.

Further, even if sudden noise is generated in the vicinity of the medium in the main scan direction, if the sudden noise is separated from the front end of the medium in the sub scan direction, that sudden noise is not included in the range of the front end of the medium. The end part detection module 155 can use the distance of the edge pixels in the sub scan direction and thereby reduce the effects of noise and the effects of the lateral sides of the medium to highly precisely detect the range of the front end of the medium and its end parts. In particular, the end part detection module 155 can remove the regions in which horizontal stripe noise is generated, from the regions for detecting the top end edge pixels and thereby utilize the top end edge pixels to highly precisely detect the range of the front end of the medium and its end parts.

Further, the end part detection module 155 may calculate as the closeness of positions in the sub scan direction the frequency of edge pixels in the sub scan direction for each of the plurality of lines in the main scan direction. The end part detection module 155 calculates the number of edge pixels in the sub scan direction detected on a line in the main scan direction for each line in the main scan direction. The end part detection module 155 generates a histogram having as a class the positions of lines in the sub scan direction in the main scan direction and as a frequency the number calculated for each line in the main scan direction. The end part detection module 155 extracts as the group of target lines the target lines at which edge pixels in the sub scan direction are detected, in the range of class of a frequency of the frequency threshold value or more in the generated histogram. The frequency threshold value is set in advance to a predetermined value (for example, 3). Note that the frequency threshold value may be set dynamically in accordance with the generated histogram. In this case, the frequency threshold value is, for example, set to ½ of the maximum frequency, etc.

The end part detection module 155 detects as the range in the main scan direction of the front end of the medium the range in the main scan direction of the group of target lines extracted. Note that the end part detection module 155 may detect as the range in the main scan direction of the front end of the medium the range reducing the detected range by exactly a predetermined margin or the range expanding the detected range by exactly a predetermined margin. The end part detection module 155 detects as the end parts in the main scan direction of the front end of the medium the positions of the two ends of the group of target lines detected as the range in the main scan direction of the front end of the medium.

Figure 12:
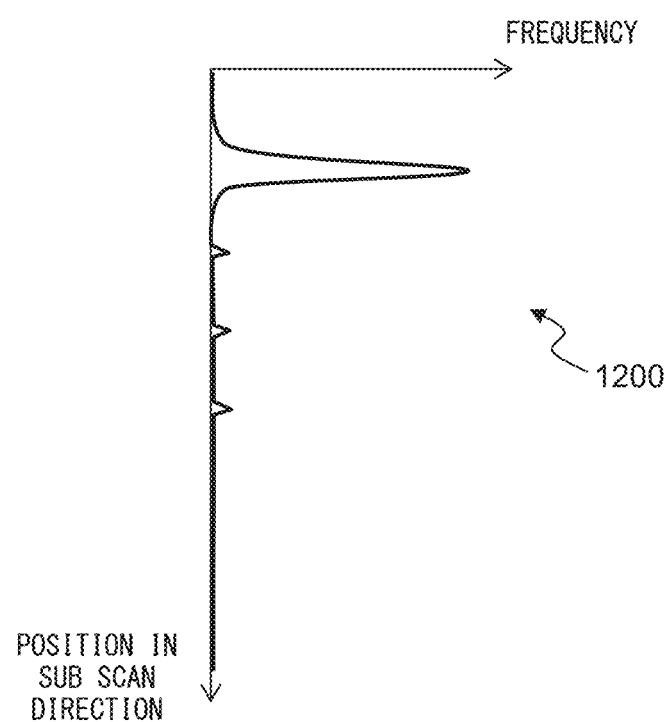
FIG. 12 is a schematic view for explaining a histogram 1200.

FIG. 12 is a schematic view for explaining a histogram 1200 generated by the end part detection module 155.

FIG. 12 shows the histogram 1200 generated from the input image 1000 shown in FIG. 10. In FIG. 12, the ordinate shows the positions (class) in the sub scan direction of lines in the main scan direction while the abscissa shows the numbers (frequencies) calculated for each line in the main scan direction. In the example shown in FIG. 12, the frequency is higher in the range where the top end edge pixels T4 to T14 corresponding to the top side of the medium are present, in the sub scan direction. On the other hand, the frequency is lower at the positions where the top end edge pixels T1, T2 corresponding to the sudden noises 1005, 1006 and the top end edge pixel T3 corresponding to the left side of the medium are present.

Therefore, in the example shown in FIG. 11, the range of the target line including the top end edge pixel T4 to the target line including the top end edge pixel T14 is detected as the range of the front end of the medium. In other words, the target lines including the top end edge pixels T1, T2 corresponding to the sudden noises 1005, 1006 and the target line including the top end edge pixel T3 corresponding to the left side of the medium 1001 are not included in the range of the front end of the medium. By using the frequency of the edge pixels in the sub scan direction for each line in the main scan direction, the end part detection module 155 can reduce the effects of noise and the effects of the lateral sides of the medium so as to highly precisely detect the range of the front end of the medium and its end parts. In particular, the end part detection module 155 can remove the regions in which horizontal stripe noise is generated, from the regions for detecting the top end edge pixels and thereby utilize the top end edge pixels to highly precisely detect the range of the front end of the medium and its end parts.

Next, the medium width detection module 156 detects the medium width based on the end parts in the main scan direction of the front end of the medium, detected by the end part detection module 155 (step S111). The medium width detection module 156, for example, detects as the medium width the Euclidian distance between the two end parts in the main scan direction at the front end of the medium. The medium width detection module 156 calculates the Euclidian distance W between the two end parts in the main scan direction of the front end of the medium in accordance with the following formula (1).

[Mathematical 1]

$$W=\sqrt{(x_2-x_1)^2+(y_2-y_1)^2} \quad (1)$$

where, $(x_1, y_1)$ is the coordinate of one end part in the main scan direction of the front end of the medium in the coordinate system having the main scan direction as the x-axis and the sub scan direction as the y-axis in the input image, while $(x_2, y_2)$ is the coordinate of the other end part in the main scan direction of the front end of the medium in the coordinate system. Note that the medium conveyance apparatus 100 may store in advance a table showing the relationship between the coordinates of the end parts and the Euclidian distance, and the medium width detection module 156 may acquire the Euclidian distance referring to the table.

Note that the medium width detection module 156 may detect as the medium width the distance in the main scan direction between the two end parts in the main scan direction of the front end of the medium. In this case, the medium width detection module 156 calculates the distance W in the main scan direction between the two end parts in the main scan direction of the front end of the medium in accordance with the following formula (2).

[Mathematical 2]

$$W=|x_2-x_1| \quad (2)$$

Next, the image acquisition module 153 determines whether the medium as a whole has been captured (step S112). The image acquisition module 153, for example, determines whether the back end of the medium has passed the position of the second medium sensor 116 based on the second medium signal received from the second medium sensor 116. The image acquisition module 153 periodically acquires the second medium signal from the second medium sensor 116 and determines that the front end of the medium has passed the position of the second medium sensor 116 when the signal value of the second medium signal changes from a value showing that the medium is present to a value showing that the medium is not present. The image acquisition module 153 determines that the back end of the medium has passed the imaging positions of the imaging devices 117 and the medium as a whole has been captured when a predetermined time period elapses from when the back end of the medium passes the position of the second medium sensor 116. Note that the image acquisition module 153 may determine that the conveyed medium as a whole has been captured when acquiring predetermined numbers of line images from the imaging devices 117.

If the conveyed medium as a whole is still not captured, the image acquisition module 153 returns the processing to step S104 and repeats the processing of steps S104 to S112.

On the other hand, if the conveyed medium as a whole is captured, the image acquisition module 153 combines all of the line images acquired to generate read image (step S113). Note that when the numbers (predetermined numbers) of lines included in the input image are set to values in which the entire medium is included, the image acquisition module 153 may use the input image as the read image.

Next, the edge pixel detection module 154 detects pluralities of edge pixels in the main scan direction from the read image (step S114). The edge pixel detection module 154 detects the edge pixels in the main scan direction based on the tonal values of the pluralities of pixels with positions in the sub scan direction which are the same as each other inside the read image and with distances in the main scan direction which are inside a predetermined range of each other. Further, the edge pixel detection module 154 detects the edge pixels in the main scan direction inside a predetermined range of the two ends parts in the main scan direction of the front end of the medium detected by the end part detection module 155 in the main scan direction.

The end part detection module 155 calculates the adjoining difference values in the horizontal direction of pixels in the horizontal lines in order from the left side inside a range of a predetermined distance from the left end of the front end of the medium detected by the end part detection module 155 for each horizontal line extending in the horizontal direction (main scan direction) inside the read image. The end part detection module 155 detects as the edge pixels the pixels with adjoining difference values in the horizontal lines which exceed the tone threshold value. The end part detection module 155 determines as the left end edge pixels the edge pixels first detected in the horizontal lines, i.e., the pixels positioned at the left-most sides in the range of a predetermined distance from the left end of the front end of the medium detected by the end part detection module 155. Similarly, the end part detection module 155 detects edge pixels in order from the right side in the range of a predetermined distance from the right end of the front end of the medium detected by the end part detection module 155. The end part detection module 155 determines as the right end edge pixels the edge pixels first detected in the horizontal lines, i.e., the pixels positioned at the right-most sides in the range of a predetermined distance from the right end of the front end of the medium detected by the end part detection module 155. The end part detection module 155 detects the left end edge pixels and right end edge pixels as the edge pixels in the main scan direction.

Note that the end part detection module 155 may calculate as the adjoining difference value the absolute value of the difference of the tonal values of two pixels separated by exactly a predetermined distance in the horizontal direction from the pixels inside the read image. Further, the end part detection module 155 may detect edge pixels by comparing the tonal values of the pixels inside the read image with a threshold value. For example, the end part detection module 155 detects a specific pixel as an edge pixel when the tonal value of the specific pixel is less than a threshold value of the tonal value and the tonal values of pixels adjoining that specific pixel or pixels separated from it by exactly a predetermined distance in the horizontal direction are the threshold values or more.

Further, the end part detection module 155 need not detect the edge pixels in the main scan direction for all of the pixels inside the read image and may detect the edge pixels in the main scan direction for each constant interval (for example, 4 pixels) in the sub scan direction inside the read image. The end part detection module 155 extracts from the horizontal lines in the read image the target lines for detecting the edge pixels in the main scan direction for each constant interval and detects the edge pixels in the main scan direction for the extracted target lines. Due to this, the end part detection module 155 can reduce the time required for detection of the end parts of the medium and reduce the processing time and processing load of the medium reading processing.

Further, in the same way as the case of detecting the edge pixels in the sub scan direction, the edge pixel detection module 154 does not detect edge pixels in the main scan direction from the low reliability regions but detects edge pixels in the main scan direction only from regions not including low reliability regions inside the input image.

Figure 13:
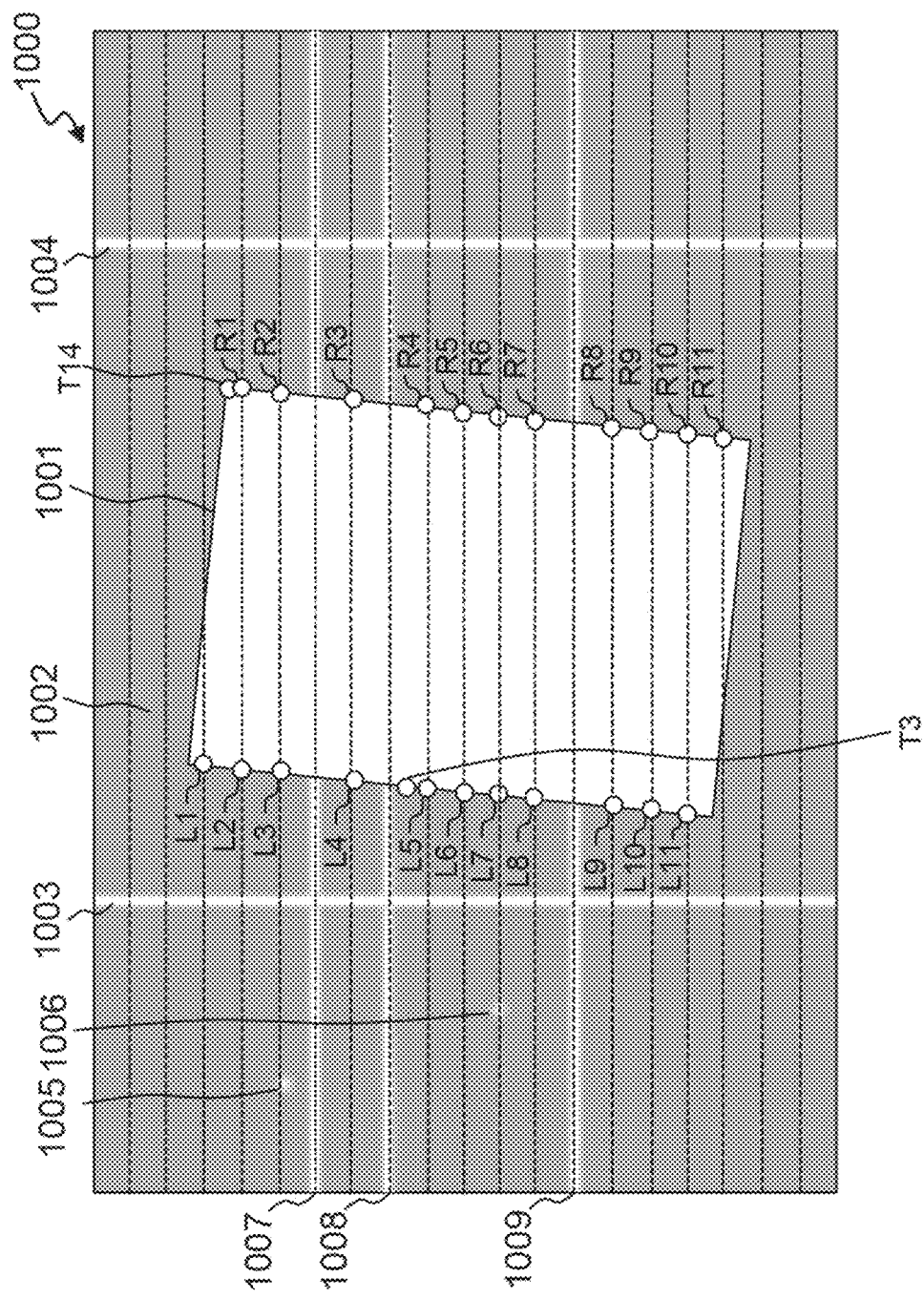
FIG. 13 is a schematic view for explaining left end edge pixels etc.

FIG. 13 is a view for explaining left end edge pixels and right end edge pixels.

In FIG. 13, the input image 1000 shown in FIG. 10 are shown. In FIG. 10, the broken lines extending in the horizontal direction show horizontal lines extracted as target lines. In the example shown in FIG. 13, the pixels L1 to L11 are detected as left end edge pixels while the pixels R1 to R11 are detected as right end edge pixels. The left end edge pixels L1 to L11 are respectively pixels corresponding to the left side of the medium. The right end edge pixels R1 to R11 are respectively pixels corresponding to the right side of the medium. The edge pixels are detected within a range of a predetermined distance in the main scan direction from the end parts T3, T14 of the front end of the medium detected by the end part detection module 155. For this reason, edge pixels corresponding to the lateral sides of the medium are detected well without being affected by the vertical stripe noises 1003, 1004 and sudden noises 1005, 1006. Further, the vicinities of the horizontal stripe noises 1007, 1008, and 1009 are set as the low reliability regions. For this reason, edge pixels corresponding to the lateral sides of the medium are detected well without being affected by the horizontal stripe noises 1007, 1008, 1009.

Next, the end part detection module 155 detects as the end parts in the main scan direction of the medium the lateral sides of the medium based on the edge pixels in the main scan direction (step S115). The end part detection module 155 detects as the left side of the medium the line passing through the left end edge pixels and detects as the right side of the medium the line passing through the right end edge pixels, using the least square method. Note that the end part detection module 155 may detect as a lateral side of the medium the line passing through the edge pixels using a Hough transform.

Next, the end part detection module 155 detects an end part in the main scan direction of the back end of the medium (step S116). In the same way as the processing of step S109, the edge pixel detection module 154 detects the edge pixels in the input image or read image and detects as the bottom end edge pixels (edge pixels in the sub scan direction) the edge pixels positioned at the bottom-most side in the vertical lines. In the same way as the processing of step S110, the end part detection module 155 detects the end parts in the main scan direction of the back end of the medium based on the bottom end edge pixels.

Next, the output control module 157 cuts out regions of the medium from the read image to generate cutout image (step S117). The output control module 157 uses the least square method or a Hough transform to detect the line passing through the top end edge pixels as the top side of the medium and detect the line passing through the bottom end edge pixels as the bottom side of the medium. The output control module 157 detects the regions surrounded by the detected top side and bottom side and the two lateral sides of the medium detected by the end part detection module 155 as the regions of the medium. The output control module 157 cuts out the detected regions of the medium to generate cutout image.

Next, the output control module 157 outputs the generated cutout image by transmitting them through the interface device 132 to the information processing apparatus (step S118). The output control module 157 may output the generated cutout image by displaying it on the display device 106. The lateral sides of the medium in the cutout image are the end parts in the main scan direction of the medium detected by the end part detection module 155. The cutout image is examples of information relating to end parts detected by the end part detection module 155. Note that the output control module 157 may not generate cutout image, but transmit the read image to the information processing apparatus and transmit coordinates showing the positions of end parts in the main scan direction of the medium detected by the end part detection module 155 inside the read image as information relating to the end parts to information processing apparatus. In this case, the information processing apparatus generates cutout image from the read image based on the received coordinates.

Further, at step S110, the output control module 157 may determine whether the medium is a card or printing paper based on the end parts of the front end of the medium detected by the end part detection module 155. In this case, the output control module 157 determines that the medium is a card when the distance between end parts of the front end of the medium is a threshold value or less and determines that the medium is printing paper when the distance between end parts of the front end of the medium is larger than the threshold value. The threshold value is, for example, set to a value of the size of a card in the longitudinal direction prescribed in ISO/IEC7810 plus a certain margin. The output control module 157 transmits information showing whether the medium is a card or printing paper as information relating to the end parts of the medium to the information processing apparatus. In this case, the information processing apparatus classifies the received image in accordance with whether the medium is a card or is printing paper. Further, the output control module 157 may periodically determine whether multi-feed of the medium has occurred based on an ultrasonic signal output from a not shown ultrasonic sensor and may make conveyance of the medium stop when multi-feed of the medium has occurred. In this case, when the medium is a card, the output control module 157 may determine that multi-feed of the medium has not occurred. Due to this, when a card is conveyed, the output control module 157 can keep it from being mistakenly determined that multi-feed of the medium has occurred.

Further, the output control module 157 may detect the size of the medium based on the end parts in the main scan direction of the medium detected by the end part detection module 155 and change the rotation speeds of the third conveyance roller 118 and the fourth conveyance roller 119 (ejection speed of medium) in accordance with the detected size of the medium. In this case, the output control module 157 detects as the size of the medium the distance between end parts in the main scan direction of the medium. Further, when at step S112 it was determined that the medium as a whole has been captured, the output control module 157 changes the rotational speed of the motor 131 so as to change the rotational speeds of the third conveyance roller 118 and fourth conveyance roller 119 in accordance with the detected size of the medium. The output control module 157 changes the rotational speed of the motor 131 so that the smaller the size of the medium, the lower (slower) the rotational speed and so that the larger the size of the medium, the higher (faster) the rotational speed. Due to this, the medium conveyance apparatus 100 can be kept from ejecting a small sized medium vigorously and scattering it on the ejection tray 104, to improve alignment of the medium on the ejection tray 104.

Further, at step S110, the output control module 157 determines whether skew of the medium has occurred based on the end parts of the front end of the medium detected by the end part detection module 155. In this case, the medium conveyance apparatus 100 stores in advance in the storage device 140 a table in which the ranges of positions of the end parts of the front end of the medium and the ranges of inclination of the front end of the medium (angle with respect to main scan direction) at which it is determined that skew of the medium has occurred are set. The output control module 157 calculates the inclination of a line passing through the two end parts of the front end of the medium detected by the end part detection module 155. The output control module 157 determines whether skew of the medium has occurred by whether the two end parts of the front end of the medium detected by the end part detection module 155 and the calculated inclination are included in the preset ranges. When it determines that skew of the medium has occurred, the output control module 157 stops the motor 131 to make the conveyance of the medium stop and outputs information showing that an abnormality has occurred in the conveyance of the medium as information relating to the end parts of the medium to notify the user.

Next, the control module 152 determines whether the stacking tray 103 has the medium remaining on it based on the first medium signal received from the first medium sensor 111 (step S119). When the stacking tray 103 has the medium remaining on it, the control module 152 returns the processing to step S104 and repeats the processing of steps S104 to S119.

On the other hand, when the stacking tray 103 does not have the medium remaining on it, the control module 152 stops the motor 131 (step S120) and ends the series of steps.

Note that the processing of step S111 may be omitted. Further, the processing of steps S114 to S117 may be omitted and the output control module 157 may output the read image at step S118. Further, at step S109, the edge pixel detection module 154 may detect the edge pixels in the sub scan direction from all regions inside the input image. In this case, at step S110, the end part detection module 155 detects the end part in the main scan direction of the front end of the medium based on only the edge pixels in the sub scan direction detected from regions not including low reliability regions among the edge pixels detected by the edge pixel detection module 154 in the input image. Simultaneously, at step S114, the edge pixel detection module 154 may detect edge pixels in the main scan direction from all regions inside the input image. In this case, at step S115, the end part detection module 155 detects the end parts in the main scan direction of the medium based on only the edge pixels in the main scan direction detected from regions not including low reliability regions among the edge pixels detected by the edge pixel detection module 154 in the input image.

As explained in detail above, the medium conveyance apparatus 100 detects the end parts in the main scan direction of the medium without using edge pixels in the low reliability regions with tonal values of the reference members 122 which change in the input image when a card or other medium with high rigidity is conveyed. Due to this, the medium conveyance apparatus 100 can remove noise generated due to movement of the second imaging device 117b in the height direction A8 and highly precisely detect the end parts in the main scan direction of the medium from the images.

In particular, the medium conveyance apparatus 100 can reduce the effect caused by vertical stripe noise even when it cannot remove foreign matter inside images using reference images acquired in advance such as when foreign matter deposits on or peels off from the imaging devices 117 while reading the medium.

Further, the medium conveyance apparatus 100 detects the end parts in the main scan direction of the front end of a medium before the medium as a whole is captured based on input image including predetermined numbers of line images, so can detect the end parts in the main scan direction of the front end of the medium early (in real time).

Figure 14:
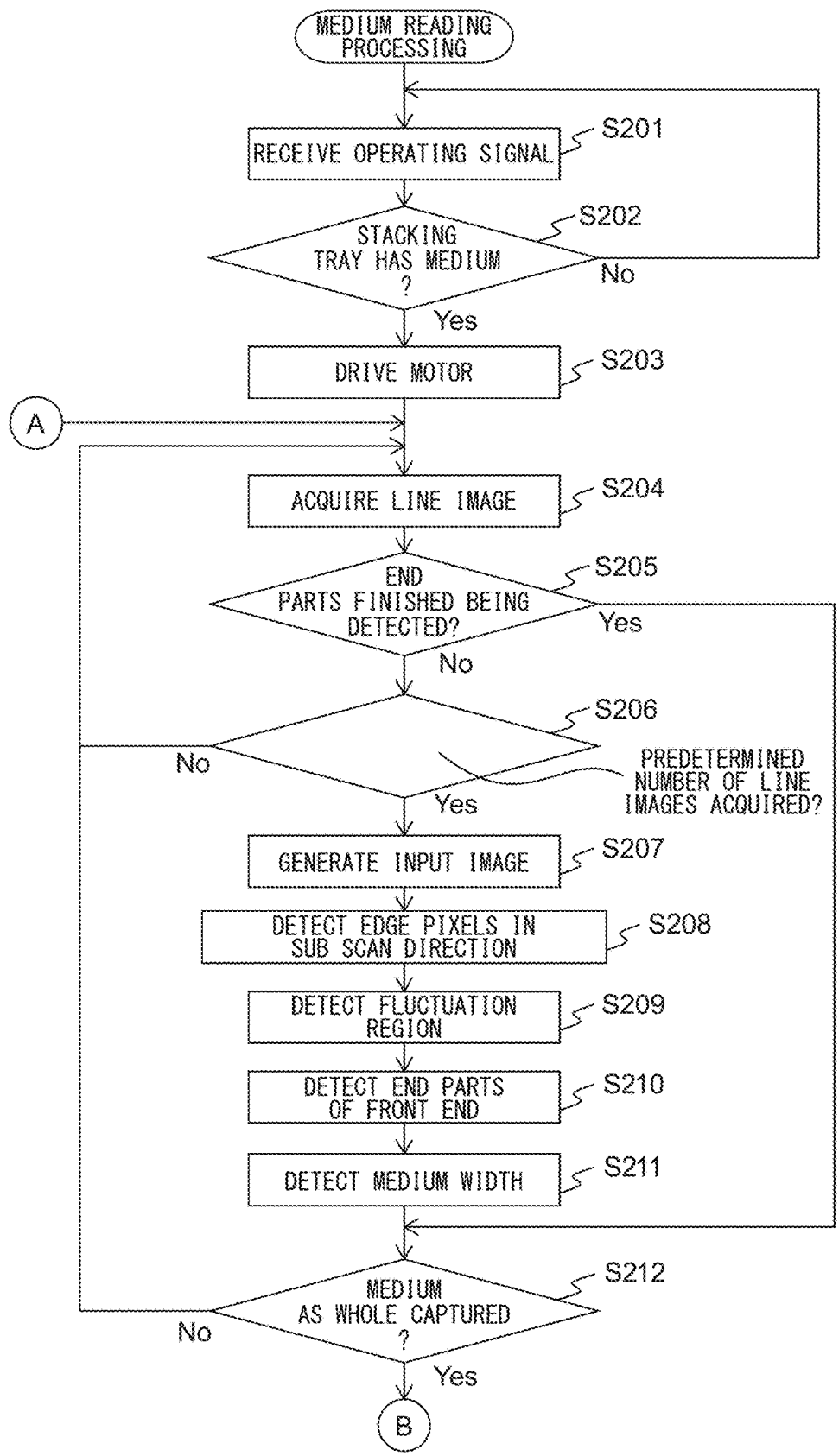
FIG. 14 is a flow chart showing an example of the operation of other medium reading processing.
Figure 15:
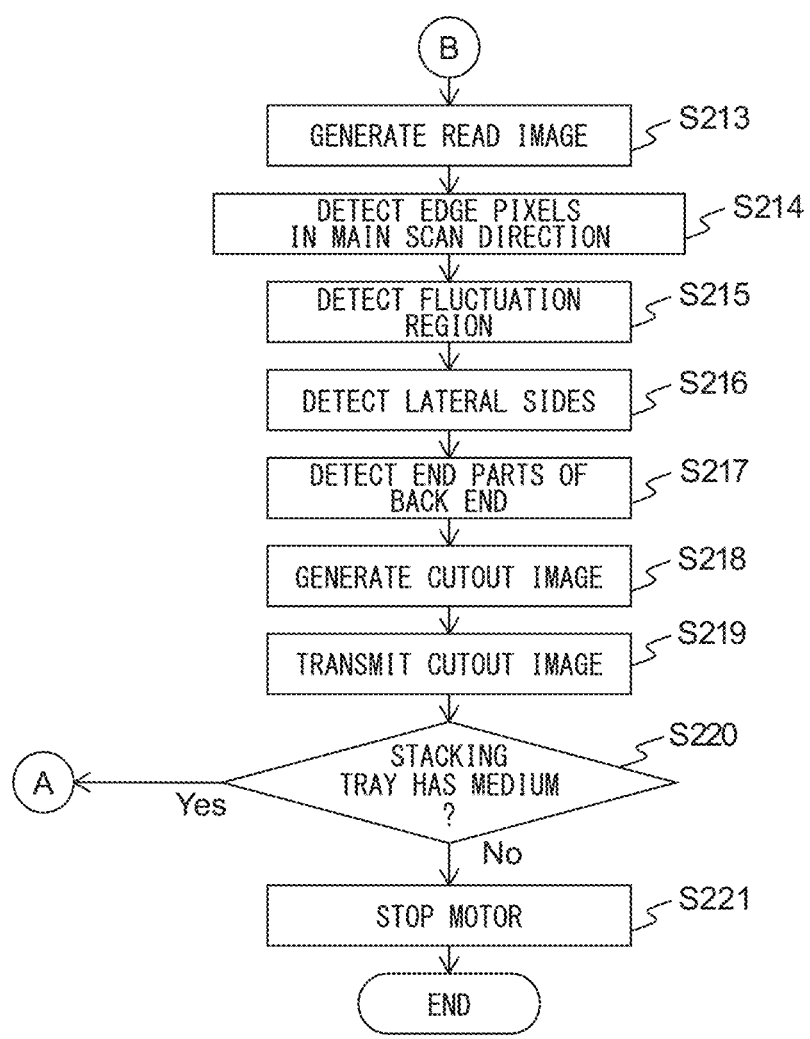
FIG. 15 is a flow chart showing an example of the operation of other medium reading processing.

FIG. 14 and FIG. 15 are flow charts showing an example of the operation of other medium reading processing. The flow charts of FIG. 14 and FIG. 15 are performed instead of the flow charts of FIG. 8 and FIG. 9. The processing of steps S201 to S207, S211 to S213, and S218 to S221 of FIG. 14 and FIG. 15 is similar to the processing of steps S101 to S107, S111 to S113, and S117 to S120 of FIG. 8 and FIG. 9, so detailed explanations will be omitted. Below, only steps S208 to S210 and S214 to S217 will be explained.

At step S208, in the same way as the processing of step S109 of FIG. 7, the edge pixel detection module 154 detects pluralities of edge pixels in the sub scan direction from the input image (step S208). However, the edge pixel detection module 154 detects edge pixels in the sub scan direction from all regions in the input image.

Next, the fluctuation region detection module 158 detects fluctuation regions with tonal values fluctuating with respect to peripheral pixels inside regions where the reference member 122 is included in the input image (step S209). The fluctuation region detection module 158 detects fluctuation regions based on the positional relationship of the pluralities of edge pixels in the sub scan direction detected by the edge pixel detection module 154.

For example, the fluctuation region detection module 158 detects as the left end edge pixels the pixels detected as the edge pixels in the sub scan direction at the left-most side and detects as the right end edge pixels the pixels detected as the edge pixels in the sub scan direction at the right-most side for each horizontal line in the input image. The fluctuation region detection module 158 calculates the fluctuation values of, with respect to positions of the left end edge pixel and right end edge pixel of each horizontal line, positions of the left end edge pixel and right end edge pixel of the horizontal line adjoining or within predetermined distance of each horizontal line below in the sub scan direction. The fluctuation region detection module 158 calculates as the fluctuation values of positions of the edge pixels the divided values acquired by dividing the difference of positions in the main scan direction of two corresponding edge pixels by the difference of positions in the sub scan direction of the two edge pixels.

The fluctuation region detection module 158 scans the horizontal lines from the horizontal line positioned at the top-most side toward the bottom side and detects as a front end position of the medium a position of the horizontal line with a magnitude of fluctuation value of any of the left end edge pixels or right end edge pixels which first becomes a fluctuation threshold value or more. The fluctuation region detection module 158 further scans the horizontal lines from the horizontal line detected as the front end position toward the bottom side. The fluctuation region detection module 158 detects as a fluctuation region a region at the bottom side from a horizontal line with a magnitude of fluctuation value of any of the left end edge pixels or right end edge pixels which once becomes less than the fluctuation threshold value, then again becomes the fluctuation threshold value or more or a horizontal line at the top side from that horizontal line by exactly a predetermined margin.

Figure 16:
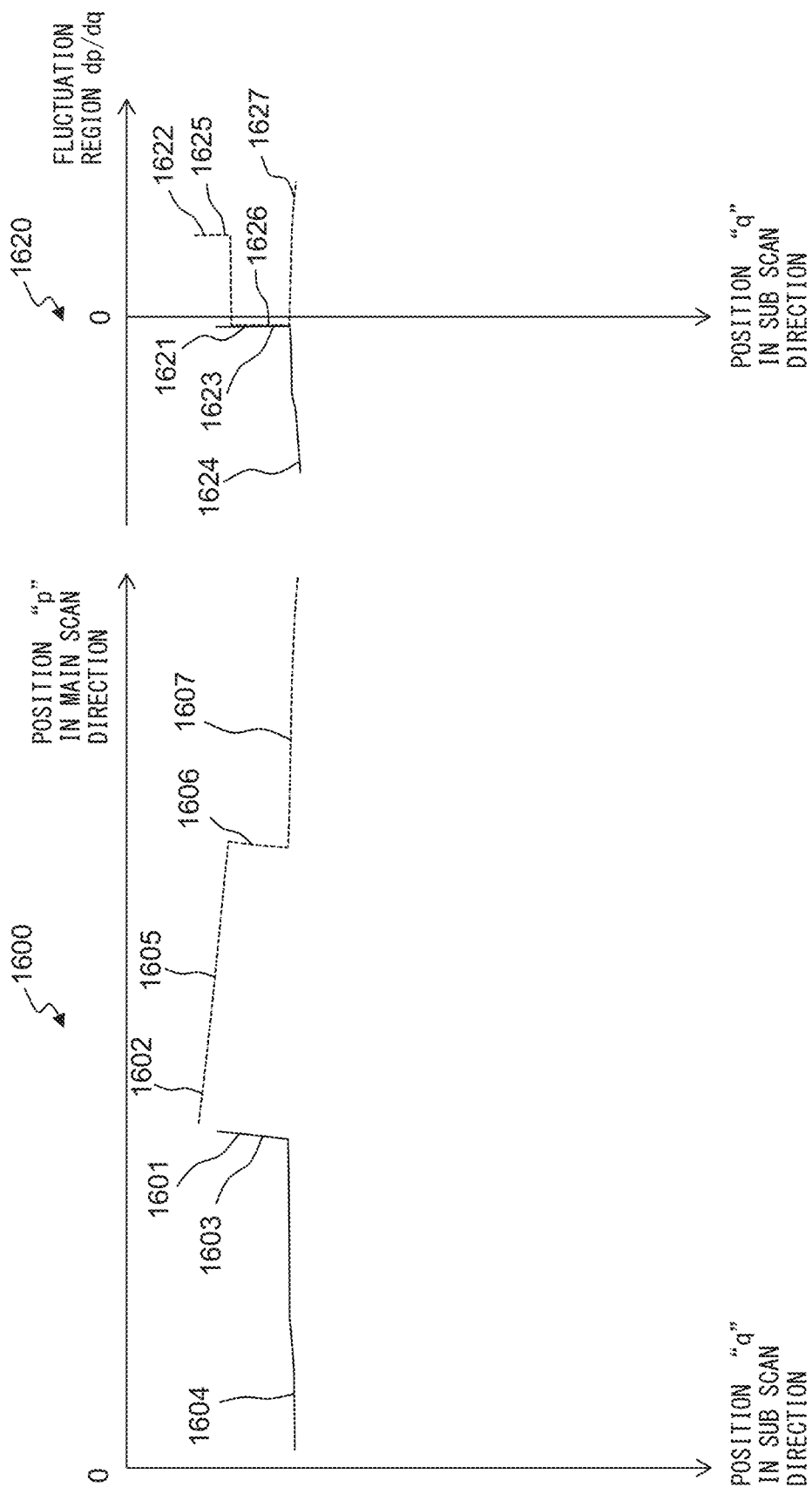
FIG. 16 is a schematic view for explaining fluctuation regions.

FIG. 16 is a schematic view for explaining fluctuation regions.

The graph 1600 of FIG. 16 is a graph showing the positions of the left end edge pixels and right end edge pixels inside the input image 1000. In the graph 1600, the ordinate shows positions in the sub scan direction inside the input image while the abscissa shows positions in the main scan direction inside the input image. In the graph 1600, the solid line 1601 shows the positions of the left end edge pixels, while the broken line 1602 shows the positions of the right end edge pixels. The region 1603 inside the solid line 1601 corresponds to the left side of the medium 1001. The region 1604 corresponds to the horizontal stripe noise 1007. The region 1605 inside the broken line 1602 corresponds to the top side of the medium 1001. The region 1606 corresponds to the right side of the medium 1001. The region 1607 corresponds to the horizontal stripe noise 1007.

The graph 1620 of FIG. 16 is a graph showing the changes in positions of the left end edge pixels and right end edge pixels inside the input image 1000. In the graph 1620, the ordinate shows the positions in the sub scan direction inside the input image while the abscissa shows the fluctuation values. In the graph 1620, the solid line 1621 shows the fluctuation values of the left end edge pixels, while the broken line 1622 shows the fluctuations values of the right end edge pixels. The regions 1623 to 1624 inside the solid line 1621 correspond to the regions 1603 to 1604 inside the solid line 1601, while the regions 1625 to 1627 inside the broken line 1622 correspond to the regions 1605 to 1607 inside the broken line 1602.

In the graph 1620, if viewing the fluctuation values from the top end, first, the absolute values of the fluctuation values become larger at the region 1625 of the right end edge pixels corresponding to the top side of the medium 1001. After that, the absolute values of the fluctuation values become smaller at the region 1623 of the left end edge pixels corresponding to the left side of the medium 1001 and the region 1626 of the right end edge pixels corresponding to the right side of the medium 1001. Further, in the region 1624 of the left end edge pixels and the region 1627 of the right end edge pixels corresponding to the horizontal stripe noise 1007, the absolute values of the fluctuation values again become larger. For this reason, a region at the bottom side from the region 1624 or region 1627 in the sub scan direction, i.e., the region at the bottom side from the horizontal stripe noise 1007, is detected as the fluctuation region.

Next, the end part detection module 155 detects the end part in the main scan direction of the front end of the medium based on the edge pixels in the sub scan direction detected from regions not including fluctuation regions detected by the fluctuation region detection module 158 inside the input image (step S210). The end part detection module 155 detects the end parts in the main scan direction of the front end of the medium in the same way as the processing of step S110.

Further, at step S214, in the same way as the processing of step S14 of FIG. 8, the edge pixel detection module 154 detects pluralities of edge pixels in the main scan direction from the read image (step S214). However, the edge pixel detection module 154 detects the edge pixels in the main scan direction from all regions at the inside of the read image.

Next, the fluctuation region detection module 158 detects fluctuation regions based on the positional relationship of the plurality of edge pixels in the main scan direction detected by the edge pixel detection module 154 (step S215).

The fluctuation region detection module 158 uses left end edge pixels and right end edge pixels of the horizontal lines detected at step S214 to detect fluctuation regions. The fluctuation region detection module 158 calculates the fluctuation values of, with respect to positions of the left end edge pixel and right end edge pixel of each horizontal line, positions of the left end edge pixel and right end edge pixel of the horizontal line adjoining or within predetermined distance of each horizontal line below in the sub scan direction. The fluctuation region detection module 158 calculates as the fluctuation values of positions of the edge pixels the divided values acquired by dividing the difference of positions in the main scan direction of two corresponding edge pixels by the difference of positions in the sub scan direction of the two edge pixels.

The fluctuation region detection module 158 scans the horizontal lines from the horizontal line of the front end position of the medium detected at step S210 toward the bottom side. The fluctuation region detection module 158 detects as the fluctuation region a region with a magnitude of fluctuation value of any of the left end edge pixel or right end edge pixel in the sub scan direction which becomes a fluctuation threshold value or more or a region expanding the region by exactly predetermined margins.

Figure 17:
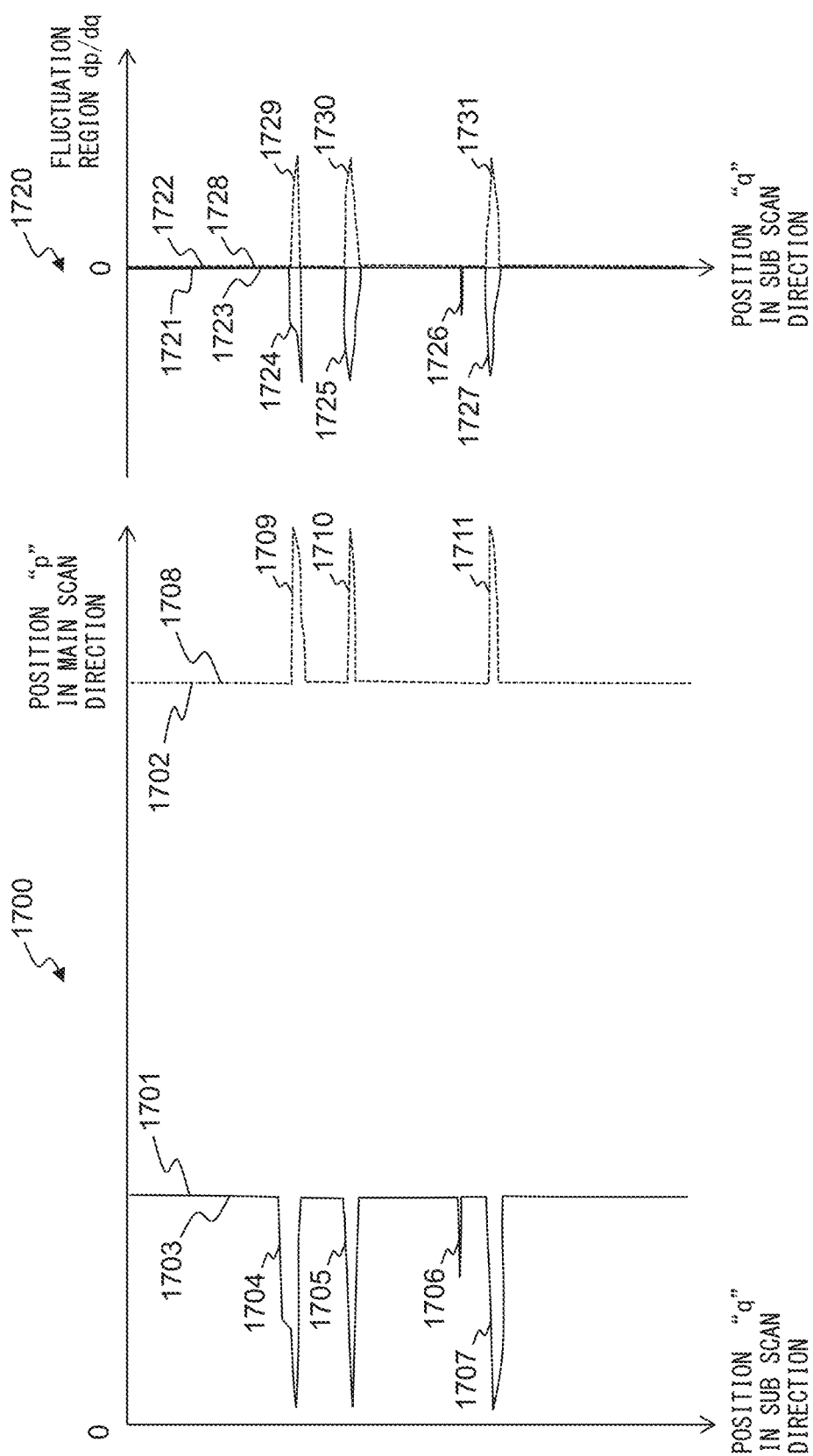
FIG. 17 is a schematic view for explaining fluctuation regions.

FIG. 17 is a schematic view for explaining fluctuation regions.

The graph 1700 of FIG. 17 is a graph showing the positions of the left end edge pixels and right end edge pixels inside the input image 1000. In the graph 1700, the ordinate shows the positions in the sub scan direction inside the input image while the abscissa shows the positions in the main scan direction inside the input image. In the graph 1700, the solid line 1701 shows the positions of the left end edge pixels, while the broken line 1702 shows the positions of the right end edge pixels. The region 1703 inside the solid line 1701 corresponds to the vertical stripe noise 1003. The region 1704 corresponds to the sudden noise 1005 and horizontal stripe noise 1007. The region 1705 corresponds to the horizontal stripe noise 1008. The region 1706 corresponds to the sudden noise 1006. The region 1707 corresponds to the horizontal stripe noise 1009. The region 1708 inside the broken line 1702 corresponds to the vertical stripe noise 1004. The region 1709 corresponds to the horizontal stripe noise 1007. The region 1710 corresponds to the horizontal stripe noise 1008. The region 1711 corresponds to the horizontal stripe noise 1009.

The graph 1720 of FIG. 17 is a graph showing the changes in positions of the left end edge pixels and right end edge pixels inside input image 1000. In the graph 1720, the ordinate shows the positions in the sub scan direction inside the input image while the abscissa shows the fluctuation values. In the graph 1720, the solid line 1721 shows the fluctuation values of the left end edge pixels, while the broken line 1722 shows the fluctuation values of the right end edge pixels. The regions 1723 to 1727 inside the solid line 1721 correspond to the regions 1703 to 1707 inside the solid line 1701, while the regions 1728 to 1731 inside the broken line 1722 corresponds to the regions 1708 to 1711 inside the broken line 1702.

In the graph 1720, if viewing the fluctuation values at the bottom side from the front end position of the medium, the absolute values of the fluctuation values become larger in the regions corresponding to the horizontal stripe noises 1007, 1008, 1009 and the regions corresponding to the sudden noises 1005, 1006. For this reason, in the sub scan direction, the regions corresponding to the horizontal stripe noises 1007, 1008, and 1009 and the regions corresponding to the sudden noises 1005, 1006 are detected as the fluctuation regions.

Figure 18:
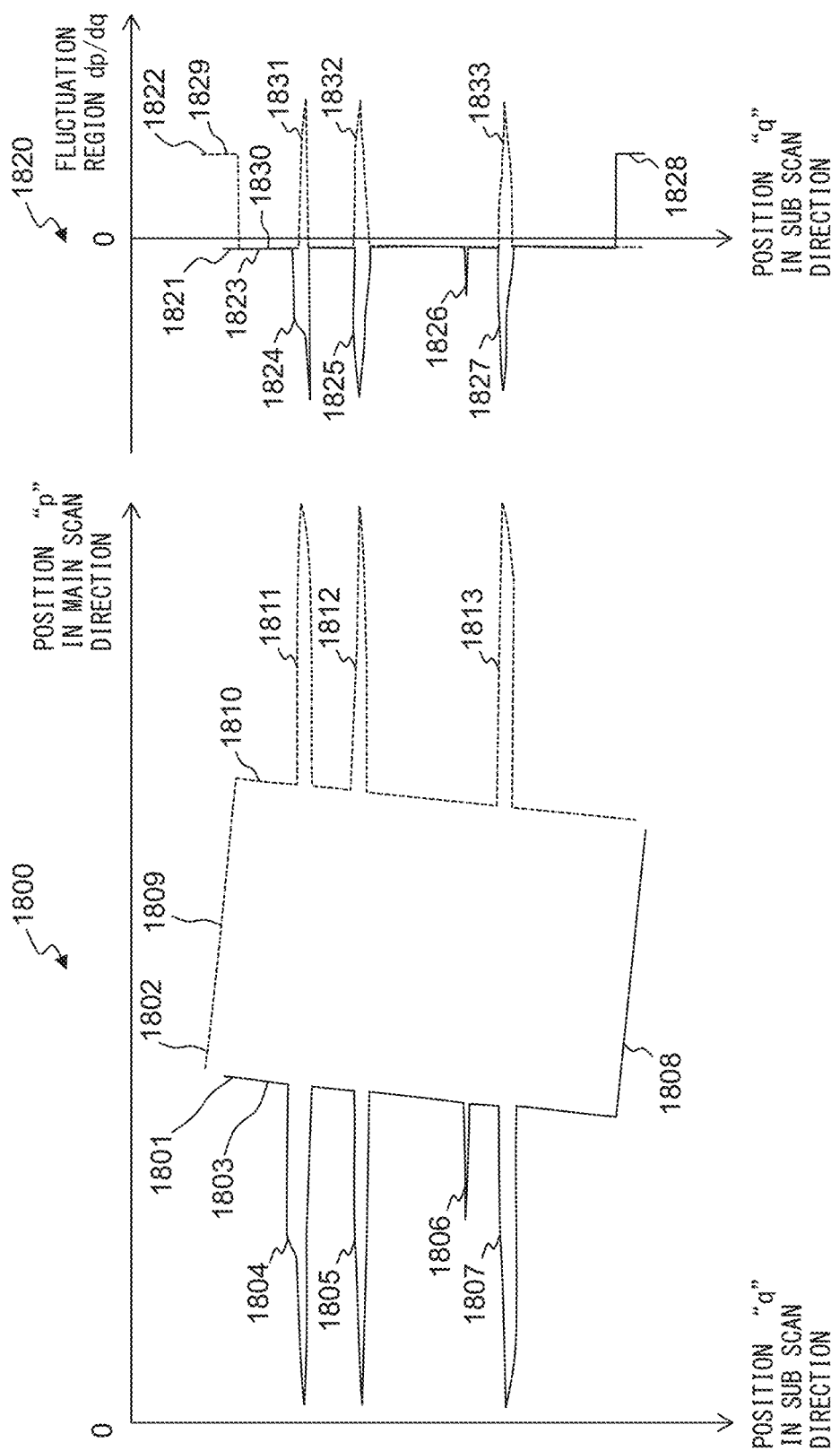
FIG. 18 is a schematic view for explaining other fluctuation regions.

FIG. 18 is a schematic view for explaining other fluctuation regions.

The graph 1800 of FIG. 18 is a graph showing the positions of a left end edge pixel and right end edge pixel in the case where vertical stripe noises 1003, 1004 are not present in the input image 1000. In the graph 1800, the ordinate shows the positions in the sub scan direction inside the input image, while the abscissa shows the positions in the main scan direction inside the input image. In the graph 1800, the solid line 1801 shows the position of the left end edge pixel, while the broken line 1802 shows the position of the right end edge pixel. The region 1803 inside the solid line 1801 corresponds to the left side of the medium 1001. The region 1804 corresponds to the sudden noise 1005 and horizontal stripe noise 1007. The region 1805 corresponds to the horizontal stripe noise 1008. The region 1806 corresponds to the sudden noise 1006. The region 1807 corresponds to the horizontal stripe noise 1009. The region 1808 corresponds to the lower side of the medium 1001. The region 1809 inside the broken line 1802 corresponds to the upper side of the medium 1001. The region 1810 corresponds to the right side of the medium 1001. The region 1811 corresponds to the horizontal stripe noise 1007. The region 1812 corresponds to the horizontal stripe noise 1008. The region 1813 corresponds to the horizontal stripe noise 1009.

The graph 1820 of FIG. 18 is a graph showing the changes in positions of the left end edge pixel and right end edge pixel inside the input image 1000. In the graph 1820, the ordinate shows the position in the sub scan direction inside the input image while the abscissa shows the fluctuation value. In the graph 1820, the solid line 1821 shows the fluctuation value of the left end edge pixel, while the broken line 1822 shows the fluctuation value of the right end edge pixel. The regions 1823 to 1828 inside the solid line 1821 correspond to the regions 1803 to 1808 inside the solid line 1801, while the regions 1829 to 1833 inside the broken line 1822 correspond to the regions 1809 to 1813 inside the broken line 1802.

In the graph 1820, if viewing the fluctuation values at the bottom side from the front end position of the medium, the absolute values of the fluctuation values become larger in the regions corresponding to the horizontal stripe noises 1007, 1008, 1009 and regions corresponding to the sudden noises 1005, 1006. For this reason, the regions corresponding to the horizontal stripe noises 1007, 1008, 1009 in the sub scan direction and the regions corresponding to the sudden noises 1005, 1006 are detected as the fluctuation regions.

Next, the end part detection module 155 detects as end parts in the main scan direction of a medium the lateral sides of the medium based on edge pixels in the main scan direction detected from regions not including fluctuation regions detected by the fluctuation region detection module 158 inside the read image (step S216). In this case, in the same way as the processing of step S114, the edge pixel detection module 154 again detects pluralities of edge pixels in the main scan direction from the read image. In other words, the edge pixel detection module 154 detects the edge pixels in the main scan direction in regions within a predetermined distance from the two end parts in the main scan direction of the front end of the medium detected by the end part detection module 155 in the main scan direction. Further, in the same way as the processing of step S115, the end part detection module 155 detects the end parts of the medium in the main scan direction.

Next, the end part detection module 155 detects end parts in the main scan direction of the back end of the medium based on the edge pixels in the sub scan direction detected from the regions not including fluctuation regions detected by the fluctuation region detection module 158 inside the read image (step S217).

The edge pixel detection module 154, in the same way as the processing of step S208, detects the edge pixels inside the input image or read image and detects the pixels positioned at the lowest side inside the vertical lines as bottom end edge pixels (edge pixels in sub scan direction). Further, the end part detection module 155, in the same way as the processing of step S209, detects the end parts in the main scan direction of the back end of the medium based on the bottom end edge pixels. The fluctuation region detection module 158 scans the horizontal lines from the horizontal line positioned at the bottommost side toward the top side and detects the position of the horizontal line with a magnitude of any fluctuation value of the left end edge pixels or right end edge pixels which has first become a fluctuation threshold value or more as the back end position of the medium. The fluctuation region detection module 158 further scans the horizontal lines from the horizontal line detected as the back end position toward the top side. The fluctuation region detection module 158 detects as the fluctuation region a region at the top side from a horizontal line with a magnitude of any fluctuation value of the left end edge pixels or right end edge pixels which once becomes less than the fluctuation threshold value, then again becomes the fluctuation threshold value or more or a horizontal line at the bottom side from that horizontal line by exactly a predetermined margin.

As explained in detail above, the medium conveyance apparatus 100 can dynamically detect the fluctuation regions and detect the end parts in the main scan direction of a medium from an image more precisely even if detecting the end parts in the main scan direction of the medium without using edge pixels in the fluctuation regions.

In particular, the medium conveyance apparatus 100 can automatically detect the end parts of the medium without setting in advance regions not using the edge pixels and thereby detect the end parts of the medium from an image regardless of the size, type, etc. of the medium.

Figure 19:
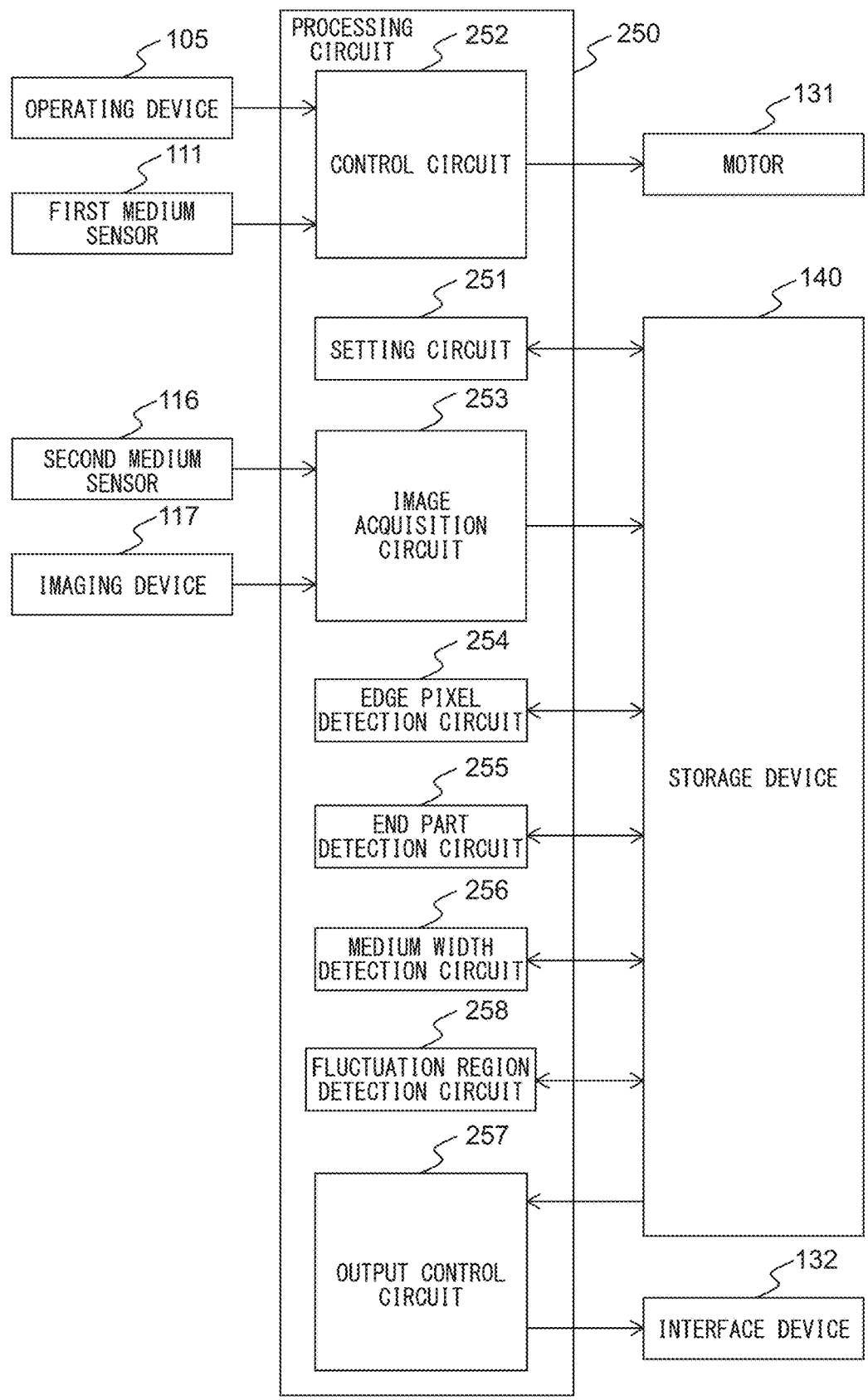
FIG. 19 is a view showing the schematic constitution of a processing circuit 250 of another medium conveyance apparatus.

FIG. 19 is a view showing the schematic constitution of a processing circuit 250 in an image reading device of still another embodiment. The processing circuit 250 is used in place of the processing circuit 150 of the medium conveyance apparatus 100 and performs the medium reading processing. The processing circuit 250 has a setting circuit 251, control circuit 252, image acquisition circuit 253, edge pixel detection circuit 254, end part detection circuit 255, medium width detection circuit 256, output control circuit 257, fluctuation region detection circuit 258, etc. Note that these parts may be configured by respectively independent integrated circuits, microprocessors, firmware, etc.

The setting circuit 251 is one example of the setting module and has a function similar to the setting module 151. The setting circuit 251 sets the low reliability regions and stores them in the storage device 140.

The control circuit 252 is one example of the control module and has a function similar to the control module 152. The control circuit 252 receives an operating signal from the operating device 105 and a medium detection signal from the first medium sensor 111 and drives the motor 131 in accordance with the received signals to control conveyance of the medium.

The image acquisition circuit 253 is one example of the image acquisition module and has a function similar to the image acquisition module 153. The image acquisition circuit 253 receives a second medium signal from the second medium sensor 116 and receives line images from the imaging devices 117 to generate input image and stores the line images and input image in the storage device 140.

The edge pixel detection circuit 254 is one example of the edge pixel detection module and has a function similar to the edge pixel detection module 154. The edge pixel detection circuit 254 reads out the input image from the storage device 140, detects edge pixels from the input image, and stores the detection results in the storage device 140.

The end part detection circuit 255 is one example of the end part detection module and has a function similar to the end part detection module 155. The end part detection circuit 255 reads out input image, detection results of edge pixels, setting information of the low reliability regions, or detection results of fluctuation regions from the storage device 140. The end part detection circuit 255 detects the end parts in the main scan direction of the medium based on the edge pixels detected from regions not including low reliability regions or fluctuation regions inside the input image and stores the detection results in the storage device 140.

The medium width detection circuit 256 is one example of the medium width detection module and has a function similar to the medium width detection module 156. The medium width detection circuit 256 reads out detection results of the end parts in the main scan direction of the medium from the storage device 140, detects the medium width based on the end parts in the main scan direction of the medium, and stores the detection results in the storage device 140.

The output control circuit 257 is one example of the output control module and has a function similar to the output control module 157. The output control circuit 257 reads out line images from the storage device 140 and generates read image. Further, the output control circuit 257 reads out detection results of the end parts in the main scan direction of the medium, generates cutout image based on the end parts in the main scan direction of the medium, and transmits them to a not shown information processing apparatus through the interface device 132.

The fluctuation region detection circuit 258 is one example of the fluctuation region detection module and has a function similar to the fluctuation region detection module 158. The fluctuation region detection circuit 258 reads input image and detection results of edge pixels from the storage device 140, detects fluctuation regions based on the positional relationship of the pluralities of edge pixels, and stores the detection results in the storage device 140.

As explained in detail above, the image reading device can more precisely detect the end parts in the main scan direction of a medium from an image even in the case of using a processing circuit 250.

REFERENCE SIGNS LIST 100 medium conveyance apparatus
112 feed roller
113 brake roller
114 first conveyance roller
115 second conveyance roller
117 imaging device
122 reference member
118 third conveyance roller
119 fourth conveyance roller
140 storage device
154 edge pixel detection module
155 end part detection module
156 medium width detection module
157 output control module
158 fluctuation region detection module

What is claimed is:

1. A medium conveyance apparatus comprising:
a conveying roller to convey a medium;
an imaging device to capture an image of the conveyed medium;
a storage device to store a low reliability region inside an input image of a medium captured by the imaging device based on a positional relationship between an imaging position of the imaging device and arrangement position of the conveying roller; and
a processor to
detect edge pixels from the input image,
detect an end part in a main scan direction of the medium based on edge pixels detected from a region not including the low reliability region inside the input image, and
output information relating to the detected end part.

2. The medium conveyance apparatus according to claim 1, wherein the storage device stores as the low reliability region a region captured by the imaging device when a front end or back end of the conveyed medium passes the conveying roller.

3. The medium conveyance apparatus according to claim 1, wherein
the imaging device is provided to be able to move in a top direction by being pushed up by the conveyed medium, and wherein
the storage device stores as the low reliability region a region captured by the imaging device when a medium nipped by the conveying roller contacts the imaging device or a member to move in association with the imaging device.

4. The medium conveyance apparatus according to claim 1, wherein the processor detects as the edge pixels only edge pixels in a sub scan direction based on tonal values of a plurality of pixels with positions in the main scan direction which are the same as each other and with distances in the sub scan direction which are within a predetermined range of each other inside the input image.

5. The medium conveyance apparatus according to claim 1, wherein the processor detects a medium width based on end parts in a main scan direction of the medium detected.

6. A medium conveyance apparatus comprising:
a conveying roller to convey a medium;
a reference member having a single color;
an imaging device located facing the reference member, to capture an image of the conveyed medium and a vicinity of the conveyed medium; and
a processor to
detect a plurality of edge pixels from an input image of the medium and vicinity of the medium captured by the imaging device,
detect a fluctuation region with tonal values fluctuating with respect to peripheral pixels inside a region where the reference member is included in the input image based on a positional relationship of the plurality of edge pixels detected,
detect an end part in a main scan direction of the medium based on edge pixels detected from a region not including the fluctuation region detected inside the input image, and
output information relating to the detected end part.

7. The medium conveyance apparatus according to claim 6, wherein the processor detects as the edge pixels only edge pixels in a sub scan direction based on tonal values of a plurality of pixels with positions in the main scan direction which are the same as each other and with distances in the sub scan direction which are within a predetermined range of each other inside the input image.

8. The medium conveyance apparatus according to claim 6, wherein the processor detects a medium width based on end parts in a main scan direction of the medium detected.

9. A method for conveying a medium, the control method comprising:
conveying a medium, by a conveying roller;
capturing an image of the conveyed medium, by an imaging device;
storing in a storage device a low reliability region inside an input image of a medium captured by the imaging device based on a positional relationship between an imaging position of the imaging device and arrangement position of the conveying roller;
detecting edge pixels from the input image;
detecting an end part in a main scan direction of the medium based on edge pixels detected from a region not including the low reliability region inside the input image; and
outputting information relating to the detected end part.

10. The method according to claim 9, wherein the storage device stores as the low reliability region a region captured by the imaging device when a front end or back end of the conveyed medium passes the conveying roller.

11. The method according to claim 9, wherein
the imaging device is provided to be able to move in a top direction by being pushed up by the conveyed medium, and wherein
the storage device stores as the low reliability region a region captured by the imaging device when a medium nipped by the conveying roller contacts the imaging device or a member to move in association with the imaging device.

12. The method according to claim 9, wherein only edge pixels in a sub scan direction is detected as the edge pixels, based on tonal values of a plurality of pixels with positions in the main scan direction which are the same as each other and with distances in the sub scan direction which are within a predetermined range of each other inside the input image.

13. The method according to claim 9, wherein a medium width is detected based on end parts in a main scan direction of the medium detected.

14. A method for conveying a medium, the control method comprising:

conveying a medium, by a conveying roller;

capturing an image of the conveyed medium, by an imaging device located facing a reference member having a single color;

detecting a plurality of edge pixels from an input image of the medium and vicinity of the medium captured by the imaging device;

detecting a fluctuation region with tonal values fluctuating with respect to peripheral pixels inside a region in which the reference member is included in the input image based on a positional relationship of a plurality of edge pixels detected;

detecting an end part in a main scan direction of the medium based on edge pixels detected from a region not including the fluctuation region inside the input image; and outputting information relating to the detected end part.

15. The method according to claim 14, wherein only edge pixels in a sub scan direction is detected as the edge pixels, based on tonal values of a plurality of pixels with positions in the main scan direction which are the same as each other and with distances in the sub scan direction which are within a predetermined range of each other inside the input image.

16. The method according to claim 14, wherein a medium width is detected based on end parts in a main scan direction of the medium detected.

* * * * *